United States Patent
Suter et al.

(10) Patent No.: US 12,445,307 B1
(45) Date of Patent: Oct. 14, 2025

(54) CRYPTOGRAPHIC AUTHENTICATION SIGNATURES FOR VERIFICATION OF STREAMING DATA

(71) Applicant: Amazon Technologies, Inc., Seattle, WA (US)

(72) Inventors: Timothy Glenn Suter, Melbourne (AU); Harvey Edward Phillips, London (GB); Bryce Edward Case, Colorado Springs, CO (US)

(73) Assignee: Amazon Technologies, Inc., Seattle, WA (US)

( * ) Notice: Subject to any disclaimer, the term of this patent is extended or adjusted under 35 U.S.C. 154(b) by 63 days.

(21) Appl. No.: 18/598,790

(22) Filed: Mar. 7, 2024

(51) Int. Cl.
  *H04L 9/32* (2006.01)
  *G06T 7/20* (2017.01)
  *H04L 9/08* (2006.01)

(52) U.S. Cl.
  CPC .............. *H04L 9/3247* (2013.01); *G06T 7/20* (2013.01); *H04L 9/0825* (2013.01); *H04L 9/3236* (2013.01); *H04L 9/3297* (2013.01); *G06T 2207/30196* (2013.01)

(58) Field of Classification Search
  CPC ... H04L 9/3247; H04L 9/0825; H04L 9/3236; H04L 9/3297; G06T 7/20; G06T 2207/30196
  See application file for complete search history.

(56) References Cited

U.S. PATENT DOCUMENTS

| | | | | |
|---|---|---|---|---|
| 2002/0176577 A1* | 11/2002 | Xu | ......................... | G06V 40/37 380/258 |
| 2008/0235517 A1* | 9/2008 | Ohmori | ................. | H04L 9/0891 713/187 |
| 2013/0159021 A1* | 6/2013 | Felsher | .................. | G16H 10/60 705/3 |
| 2014/0149395 A1* | 5/2014 | Nakamura | .............. | G06F 21/16 707/722 |
| 2015/0086014 A1* | 3/2015 | Adkins | ................ | H04N 1/4486 380/243 |

* cited by examiner

*Primary Examiner* — El Hadji M Sall
(74) *Attorney, Agent, or Firm* — K&L Gates LLP

(57) ABSTRACT

Systems and techniques are described for signing and verifying a data stream with an encryption signature. An example method includes determining, for a data block group, an initialization vector. The example method also includes generating, based at least in part on the data block group, encrypted hash data. The example method also includes determining an encryption signature based at least in part on the encrypted hash data, a private key, and the initialization vector. The example method also includes inserting the encryption signature into the data block group. The example method also includes causing transmission, by a network interface to a media server, of the data block group and the encryption signature. Finally, the example method includes causing verification, via the media server using a public key and synchronized data, that the data block group was generated by the computing device.

35 Claims, 7 Drawing Sheets

CRYPTOGRAPHIC AUTHENTICATION SIGNATURES FOR VERIFICATION OF STREAMING DATA

BACKGROUND

Digital cameras and audio recorders provide users with the ability to capture video and audio information as events unfold in real-time. Many digital cameras and audio recorders, such as those provided by security systems, can capture and stream events in real-time via communication networks for near immediate review by individuals or organizations.

DETAILED DESCRIPTION

Figure 1:
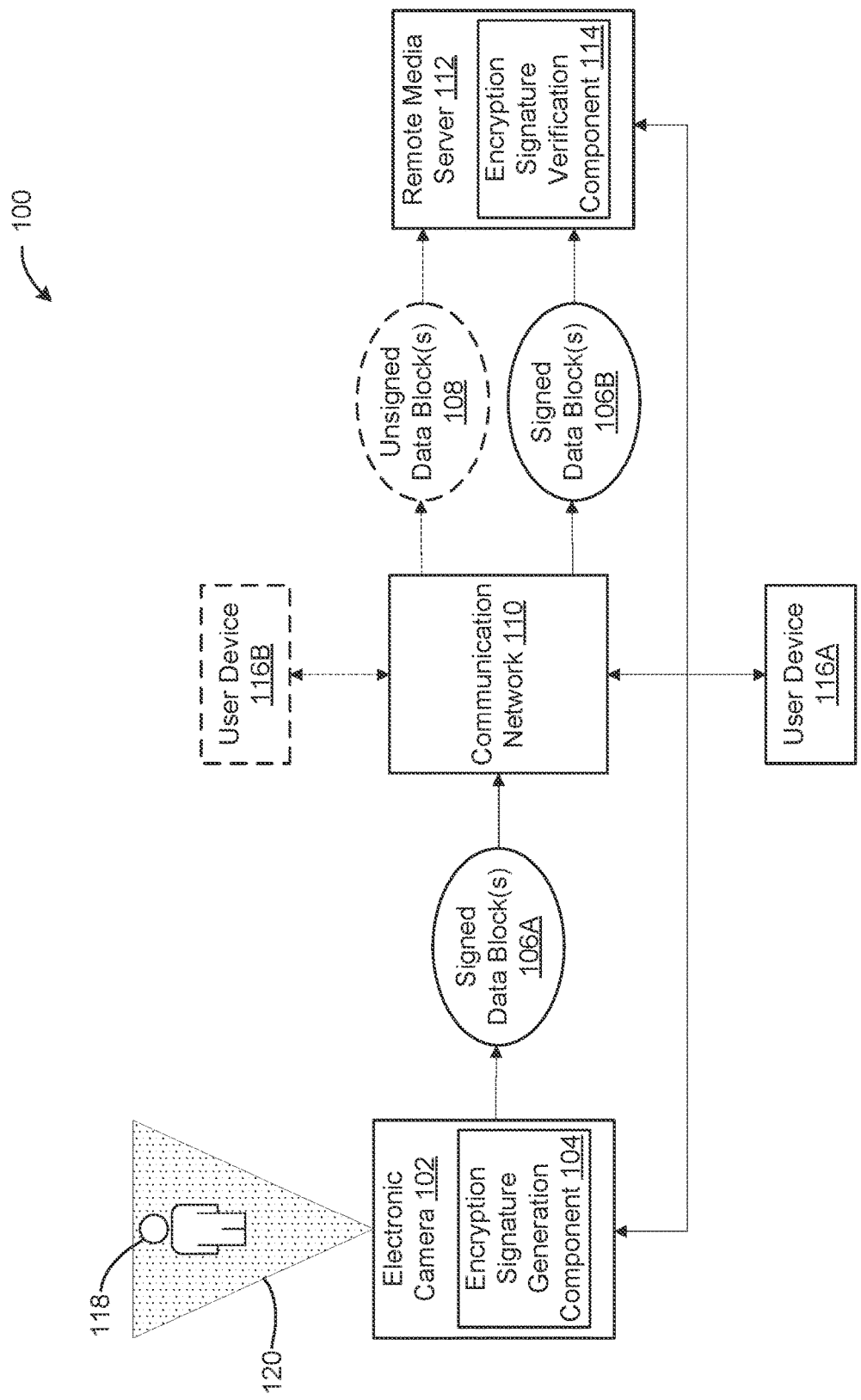
FIG. 1 illustrates example systems for generating and verifying data blocks incorporating an encryption signature, in accordance with various aspects of the present disclosure.

In the following description, reference is made to the accompanying drawings which illustrate several examples for the present disclosure. It is understood that other embodiments may be utilized and that mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

As better resolution electronic cameras become more cost effective to produce and easier to integrate into existing technologies (e.g., security systems, social media, traditional media, smartphones, etc.), individuals (e.g., homeowners, etc.) and entities (e.g., companies, news outlets, political parties, etc.) can more easily record and share (e.g., via streaming platforms, social media, etc.) various videos almost instantly over the Internet. For example, homeowners may monitor their homes (e.g., in real-time or near-real-time) while they are away through security cameras or doorbell cameras communicatively coupled (e.g., via a companion application) to their mobile devices. In addition, politicians or other public figures (e.g., a chief executive officer (CEO) of large publicly traded company) may leverage electronic cameras and/or video streaming to share information with their constituents, employees, and/or the general public on a more frequent basis.

While individuals and entities may reap many benefits from traditional electronic camera and video streaming systems, such traditional systems prioritize confidentiality and availability of their data streams without ensuring the integrity of the content (e.g., video, audio, etc.) provided beyond associating the stream with a particular user via a user's authentication token. Because a user's authentication token can be compromised (e.g., stolen), forged streaming data may be delivered to a media server and associated with a user's account without verifying the integrity or true source device of the streaming data.

As a result, such systems are increasingly the target of attackers, such as hackers, burglars, and/or others criminals that seek to manipulate these technologies for their own benefit. For example, a hacker may manipulate a doorbell camera's video stream by inserting an artificially generated video depicting a homicide (or other crime) to scare the homeowner or create a situation where law enforcement is dispatched to the home while anticipating a high use of force. As another example, a burglar attempting to break into a home or business may steal and loop prerecorded footage into a security camera's video stream to conceal their criminal activities. Moreover, "deepfake" videos may be circulated via the Internet showing politicians or other public figures in a less than favorable light to cause political or financial harm (e.g., reduce a company's stock value, cause legal proceedings, etc.).

In addition to the technical problems associated with streaming security and video authentication described above, traditional systems may also suffer from other non-attacker related technical problems. For example, media servers of traditional systems do not provide in-stream verifiable non-repudiation (i.e., a service that provides proof of the integrity and origin of the streaming data). Moreover, attacker-based and non-repudiation technical problems may be compounded by the use of authorized (or unauthorized) third-party cameras (or other bootleg devices) that may further lack the security and/or authentication features provided by official cameras working in conjunction with their operating ecosystem (e.g., companion application, media server, etc.). Further, unauthorized (or bootleg) cameras may actively seek to exploit these technical problems in order to avoid detection by a host operating ecosystem. For example, an unauthorized camera may connect with an authorized camera (or other computing device) to leverage one or more authentication tokens.

In contrast to the conventional systems described above, one or more approaches described herein cryptographically provide streaming compatible techniques for verifying the integrity and source device associated with streaming data (e.g., video data). The present disclosure sets forth systems, methods, and apparatuses that, inter alia, provide improved authentication for streaming data using, in some examples, in-stream (e.g., stored in a header of a data block or the like) encryption signatures to verify the authenticity, continuity, and/or original source of the steaming data. There are many advantages of these and other examples described herein over traditional systems, such as those described above. One advantage of one or more approaches described herein is that such approaches may be used to detect modifications made to genuine streaming data, such as the insertion of deepfake video data into genuine video data. Another advantage of one or more approaches described herein is that such approaches may be used to detect wholly forged streaming data, such as video data created by a hacker and forged with a compromised authentication token. Further, one or more approaches can prevent cross-streaming events by verifying the data stream's originating source device independent of user authentication. Accordingly, a first genuine data stream cannot be crossed with a second genuine data stream (even though both can be properly authenticated and verified). For example, in accordance with one or more implementations, the first genuine data stream cannot be sent to second user's account and accessed by the second user without both the first user and the second user having access to a shared or secondary key (e.g., secondary to each users' individual private key). Additionally, or alternatively, video data (or image data) of the first genuine data stream cannot be accidently mixed with audio data of the second genuine data stream (e.g., because the encryption signatures would not match between the video data (or image data) and the audio data). Still another advantage is that example embodiments can verify the originating source device per-stream so that unauthorized devices cannot connect with authorized cameras to leverage an authorized ecosystem (e.g., Ring doorbell and security camera ecosystem). Another advantage is that example embodiments can be implemented with other digital security and data protection techniques, such as end-to-end encryption (E2EE), digital security certificates, digital fingerprinting, watermarking, and digital rights management (DRM) technologies, without compromising the effectiveness thereof.

Moreover, it should be appreciated that such example embodiments as set forth herein solve particular technical problems, such as those identified and described above for conventional electronic camera and/or video streaming systems. It will be appreciated that the scope of the present disclosure encompasses many potential example embodiments in addition to those described above, some of which will be described in further detail below.

FIG. 1 is a diagram illustrating at least an example of the system 100 for generating and verifying data blocks incorporating an encryption signature, in accordance with various aspects of the present disclosure. As shown, the system 100 may include an electronic camera 102 communicatively coupled, via at least a communication network 110, with a remote media server 112 and/or one or more user devices (e.g., 116A, 116B, or the like).

The communication network 110 may be any wired and/or wireless communication network. Examples of communication network 110 may include, without limitation, a local area network (LAN), a wide area network (WAN), Wi-Fi, the Internet, Bluetooth®, the like, or any combination thereof. In some examples, the system 100 may include one or more additional computing devices (e.g., user device 116A, remote media server 112, or the like) and/or additional electronic cameras (e.g., electronic camera 102 or the like) that may be communicatively coupled over the communication network 110. Although depicted as separate components in FIG. 1, one or more user devices (e.g., 116A or the like) may be part of the electronic camera 102. In some examples, the one or more user devices (e.g., 116A, 116B, or the like) may be implemented in one or more chips of electronic camera 102. In some examples, the electronic camera 102 may be implemented in one or more chips of one or more user devices (e.g., 116A, 116B, or the like). For example, one or more of the techniques used by the one or more user devices (e.g., 116A, 116B, or the like) may be performed using an application specific integrated circuit (ASIC) and/or using a field programmable gate array (FPGA). In some other examples, various techniques described herein may be instantiated in software (e.g., applications, firmware, or the like) executed by one or more processors of the electronic camera 102, one or more user devices (e.g., 116A, 116B, or the like), remote media server 112, and/or any combination thereof.

Electronic camera 102 may comprise one or more of a security camera, doorbell camera, mobile device camera, mirrorless camera, digital single lens reflex (DSLR) camera, the like, and/or any combination thereof. Electronic camera 102 may include an encryption signature generation component 104 (as described in further detail below with reference to FIG. 2) that is configured to apply one or more encryption signatures to one or more data blocks generated, at least in part, by electronic camera 102. Further, electronic camera 102 may comprise, at least in part, electronic device 401 as described in further detail below with reference to FIG. 4.

As shown in FIG. 1, electronic camera 102 may be configured to record a subject 118 within a field-of-view 120 of electronic camera 102. For example, electronic camera 102 may record a delivery driver (i.e., subject 118) with a package walking toward a porch that is within the field-of-view 120 of a doorbell camera (i.e., electronic camera 102). In some examples, subject 118 may include one or more events or trigger events as described herein. For example, subject 118 may be one or more of a human being, animal, object, location, and/or any combination thereof that is within a field-of-view 120 of electronic camera 102. In some examples, a field-of-view 120 of electronic camera 102 may include a location or area proximate the electronic camera 102. For example, the field-of-view 120 may include a location such as an office building, home, indoor space, outdoor space, and/or any other physical location or combination of physical locations that may be monitored and/or recorded by the electronic camera 102.

In some examples, electronic camera 102 may be configured to operate in a continuous video recording mode and/or a non-continuous video recording mode. For example, a companion application to electronic camera 102 (e.g., hosted on the user device 116A) may be used to configure the electronic camera 102 to operate in a continuous recording mode and/or to operate in an event-triggered recording mode. For example, electronic camera 102 may remain in a sleep or standby mode without recording video and/or audio and upon detection of a trigger event then electronic camera 102 may initialize recording video and/or audio. In some examples, the video and/or audio may be represented by data blocks generated by electronic camera 102.

In some examples, electronic camera 102 may comprise a hardware and/or software based encoder that is configured to encode video data blocks, or the like, for transmission and/or storage. In some examples, the encoder may encode audio and/or video captured (i.e., recorded) by electronic camera 102 as data blocks using any desired audio and/or video encoding technology, such as H.264 (or advanced video coding (AVC)), H.265 (or high efficiency video coding (HEVC)), MP4, advanced audio coding (AAC) (e.g., composed in audio data transport stream (ADTS) frames), AV1, VP9, PCMU, OPUS, the like, or any combination thereof. Each data block may represent a portion of audio and/or video data. In some examples, a data block and/or a data block group may be a predetermined time length of video (e.g., 120 seconds or any other desired time length). For example, a data block and/or a data block group may include one or more frames of image data and/or one or more groups of pictures (GoPs). In some examples, a data block may be encoded to be within the predetermined time length (e.g., to within a tolerance of ±5%, 10%, or any other tolerance). In some examples, data blocks may be of a variable time length. For example, data blocks may be of a predetermined file size (e.g., to within a tolerance of ±5%, 10%, or any other tolerance). In some examples, data blocks may be grouped together. For example, H.264 and/or H.265 data blocks may be split into groups based on one or more occurrences of video parameters that may result in approximately equal sized groups (e.g., to within a tolerance of ±5%, 10%, or any other tolerance) of data blocks (e.g., that correspond to keyframes or any other audio and/or video parameter). In some examples, H.264 and/or H.265 data blocks may be split into groups based on a type of block (e.g., a network abstract layer unit (NALU) type or the like) as will be described in further detail below. For example, the electronic camera 102 (or the like) may detect a video parameter set (VPS) unit type periodically in time and split a stream of data blocks into data block groups for that NAL unit type, the resulting data block groups may be representative of approximately equal units of time. In some examples, a rate control algorithm may dynamically adjust the size of data blocks and/or data block groups. For example, a rate control algorithm may dynamically adjust the size of GoPs by increasing the number of pictures (or frames) per GoP (e.g., with a tolerance). It should be understood that the rate control algorithm may adjust the size of the GoP (e.g., based on a maximum noise threshold) in order to reduce noise (e.g., jitter, visual static, audible static, and/or other irregular data fluctuations) in the data stream. For example, if there is a lot of motion in video scene then smaller GoPs may be used because the frames may be larger in terms of file size (e.g., byte size or the like). In some examples, a data block group may comprise one or more data blocks. In the context of video, a data block may include one or more frames of image data (and associated metadata). Similarly, in the context of audio, a data block may include one or more frames (or other units) of audio data (and associated metadata).

Still with reference to FIG. 1, electronic camera 102 may be configured to sign one or more data blocks using encryption signature generation component 104 to produce signed data block(s) 106A. For example, a doorbell camera may encode one or more video data blocks representative of a video stream of a front yard. Further, the doorbell camera, utilizing encryption signature generation component 104, may insert an encryption signature into one or more of the video data blocks (or groups of video data blocks) of the video stream. In some examples, signed data block(s) 106A may comprise one or more data block groups. Further, each of the data block groups may contain at least data block that comprises the encryption signature (e.g., the last or final data block in the data block group). In some examples, each of the data block groups may contain at least one data block that comprises a unique identifier indicating whether the respective data block group comprises the encryption signature. For example, an AVC and/or HEVC encoded data block may comprise a universally unique identifier (UUID) indicating that the encryption signature is present (e.g., in that particular data block).

Signed data block(s) 106A may be transmitted, at least in part, from the electronic camera 102 to one or more servers of communication network 110 wherein (as represented by signed data block(s) 106B) they are further transmitted to a remote media server 112. In some examples, signed data block(s) 106B may be the same or substantially similar to signed data block(s) 106A. For example, signed data block(s) 106B may represent authentic versions (e.g., that have not been tampered with by an attacker) of signed data block(s) 106A that were transmitted from the electronic camera 102 via communication network 110 to the remote media server 112. In some examples, the signed data block(s) 106A-106B may comprise recorded video (e.g., streaming video) which may be sent by the electronic camera 102 to a storage device associated with remote media server 112 that may be configured to store the video for later streaming and/or playback (e.g., via a companion application hosted on the user device 116A).

Unsigned data block(s) 108, as shown, may represent non-authentic versions of the signed data block(s) 106A generated by the electronic camera 102. In some examples, the unsigned data block(s) 108 may be copies of the signed data block(s) 106A that have had the encryption signature, at least partially, removed and/or broken. For example, an attacker via user device 116B may intercept the signed data block(s) 106A during transmission through one or more servers and/or communication channels of the communication network 110. Further, the attacker may at least partially replace the signed data block(s) 106A with different data such as by replacing recorded video from the electronic camera 102 with alternate video (e.g., generated by an artificial intelligence or taken from another camera). In some examples, the attacker may insert alternate video without removing any portion of the originally recorded video. In such examples, the alternate video provided by the attacker may not include the encryption signature of the signed data block(s) 106A. In some examples, the unsigned data block(s) 108 may include one or more broken, forged, or otherwise altered encryption signatures (e.g., generated by an attacker). In some examples, any portions of the originally recorded video may still contain the encryption signature. It should be appreciated that in some examples the unsigned data block(s) 108 may be packaged by an attacker with at least a portion of the signed data block(s) 106A (e.g., that may still contain an encryption signature).

Remote media server 112 may comprise one or more servers (e.g., application server, etc.), computing devices, and/or storage devices as described herein. Remote media server 112 may include an encryption signature verification component 114 (as described in further detail below with reference to FIG. 3) that is configured to verify the presence, absence, and/or authenticity of one or more encryption signatures contained within one or more data blocks (e.g., signed data block(s) 106B or unsigned data block(s) 108) received by the remote media server 112. In some examples, the remote media server 112 may be configured to provide, at least in part, the signed data block(s) 106B to an authenticated user device (e.g., user device 116A). For example, the remote media server 112 may verify the authenticity of signed data block(s) 106B and allow streaming and/or playback of a video associated with signed data block(s) 106B via a companion application hosted on the user device 116A. It should be understood that the user of user device 116A may be the owner and/or operator of electronic camera 102 and may be authenticated to access any data associated with electronic camera 102 via the companion application, such as by entering a login, password, and/or other authentication credentials.

In some examples, the remote media server 112 may provide an indication (e.g., notification, alert, graphical icon, and/or the like) indicating whether the authenticity of a video stream and/or other data can be verified. For example, if user device 116A requests to playback video associated with signed data block(s) 106B then the remote media server 112 may provide a text message, graphical green "check" icon, and/or the like (e.g., via a graphical user interface of a companion application) indicating that the video associated with signed data block(s) 106B has been verified successfully. In some examples, for signed data block(s) 106B to be verified successfully one or more conditions may be required including that the originating device was determined to be electronic camera 102 and/or that the video continuity from the beginning to the end is complete (e.g., no unsigned data block groups were detected). In some examples, the video continuity may be verified for one or more portions of a streaming video. For example, the electronic camera 102 may lose Wi-Fi connectivity during a portion of the video stream and as a result the encryption signatures during that portion of the video stream may be missing, broken, and/or otherwise un-authenticatable. During an un-authenticatable portion of the video stream the remote media server 112 may provide another text message, graphical red "X" icon, and/or the like (e.g., via a companion application) indicating that that portion of video cannot be verified. In some examples, a verifying peer may permit a certain number (e.g., based on a tolerance threshold) of data blocks and/or data block groups to fail verification before the verifying peer rejects the entire data stream (or video stream) and/or a portion thereof. Some such examples related to intermittent connectivity, and/or the like, are described below with reference to FIG. 6.

In some examples, the remote media server 112 may block playback of an un-authenticatable video stream (or prevent review of other un-authenticatable data), such as a video stream (or other data) associated with unsigned data block(s) 108 and may also provide an indication (e.g., text message, graphical red "X" icon, and/or the like) that that whole video stream cannot be verified. In some examples, the remote media server 112 may provide an indication that that whole video stream cannot be verified but the remote media server 112 may still allow playback of the un-authenticatable video stream (or allow review of other un-authenticatable data). For example, a user may incorporate a third-party electronic camera into their security system that is authorized for use with the remote media server 112 but the third-party electronic camera may not be equipped with encryption signature generation component 104. Accordingly, any video or other data generated by the third-party electronic camera may not be verifiable by the encryption signature verification component 114. However, in such an example, any video or other data generated by one or more electronic cameras (e.g., electronic camera 102) incorporated into the same security system (with the third-party electronic camera) may still be verifiable by the encryption signature verification component 114.

Now that examples of system 100 for generating and verifying data blocks incorporating an encryption signature have been described above with reference to FIG. 1, further examples of the encryption signature generation component 104 will now be described below with reference to FIG. 2.

Figure 2:
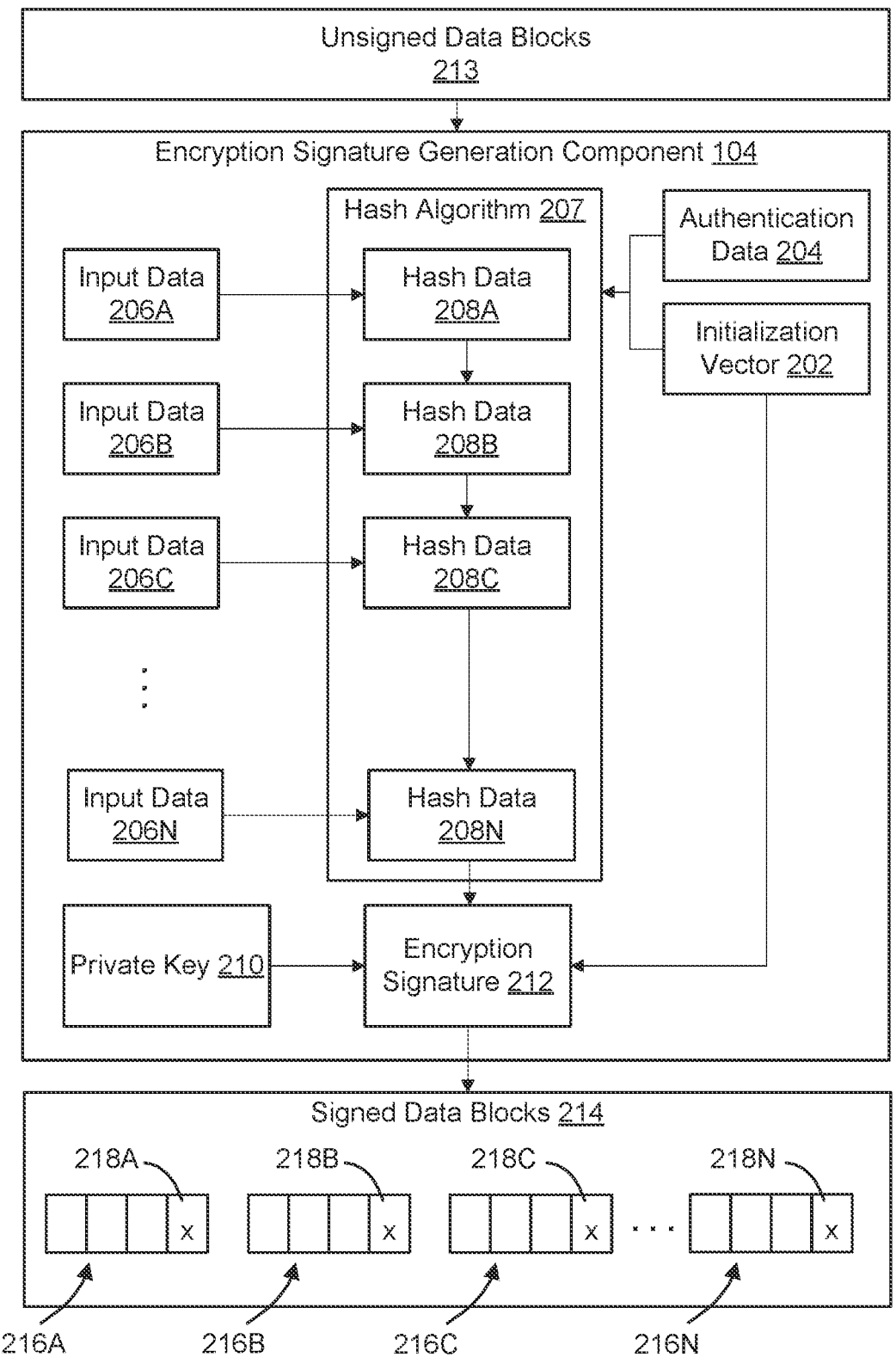
FIG. 2 illustrates example components for generating and applying an encryption signature to data blocks, in accordance with various aspects of the present disclosure.
Figure 4:
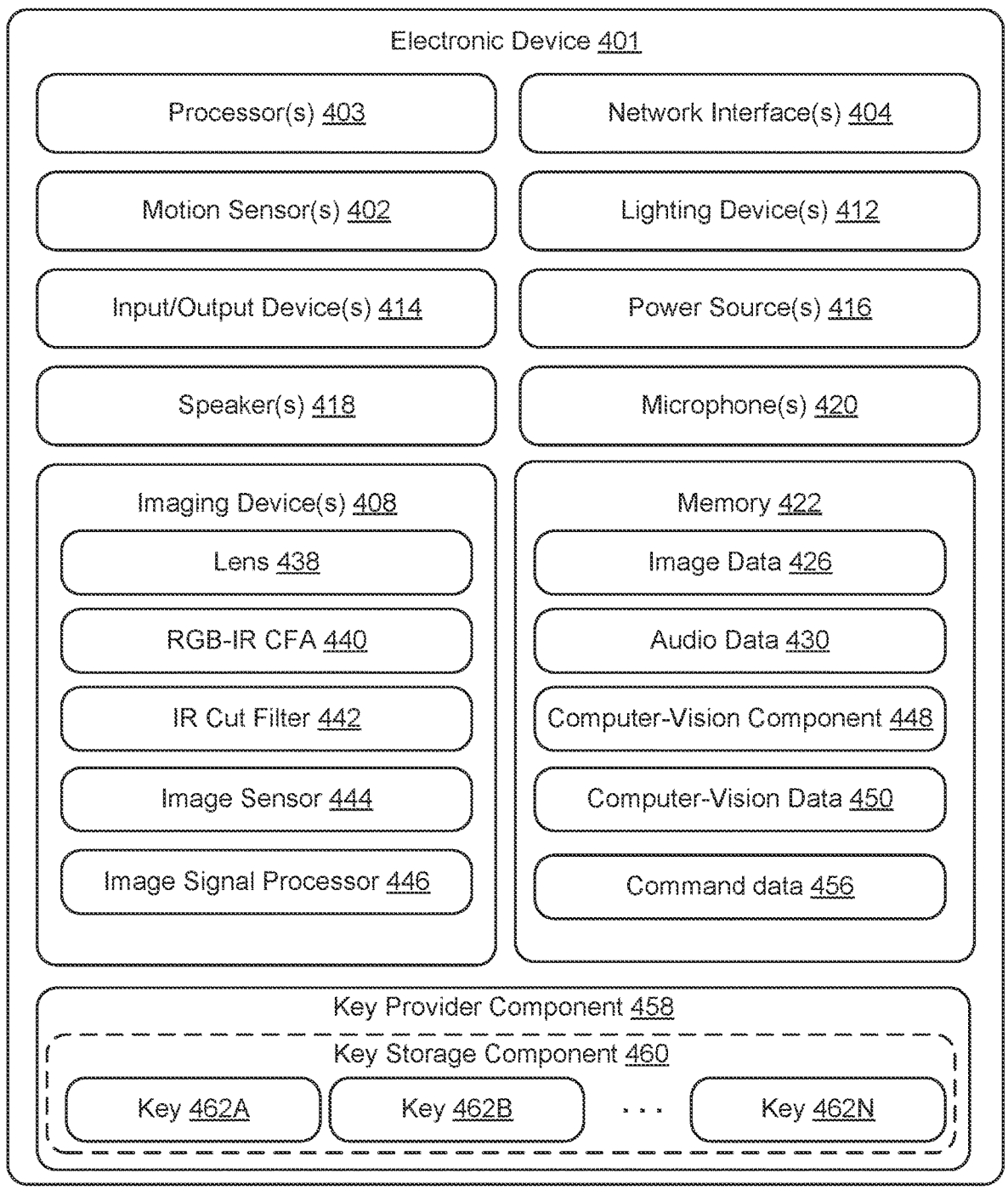
FIG. 4 illustrates example electronic devices, in accordance with various aspects of the present disclosure.

FIG. 2 is a diagram illustrating at least an example of the encryption signature generation component 104 for generating and applying encryption signatures to data blocks, in accordance with various aspects of the present disclosure. The encryption signature generation component 104 may be hosted by one or more computing devices and/or electronic devices as described herein, such as the electronic camera 102 as shown in FIG. 1 and/or the electronic device 401 as shown in FIG. 4. As shown, the encryption signature generation component 104 may receive (e.g., from one or more components of the electronic camera 102 or the like) one or more of an initialization vector 202, authentication data 204, input data (e.g., input data 206A-206N), a private key 210, or any other data for signing data blocks as described herein. For example, an imaging device and/or microphone (e.g., imaging device(s) 408 and/or microphone(s) 420 as described below with reference to FIG. 4) of the electronic camera 102 may capture and provide one or more unsigned data blocks 213 (e.g., video data including image data 426 and/or audio data 430 as described below with reference to FIG. 4) to the encryption signature generation component 104. In some examples, the encryption signature generation component 104 may generate, at least in part, (e.g., based on data from one or more components of the electronic camera 102 or the like) one or more of the initialization vector 202, the authentication data 204, the input data (e.g., input data 206A-206N), hash data (e.g., hash data 208A-208N), an encryption signature 212, or any other data for signing data blocks as described herein. For example, the encryption signature generation component 104 may further include a system clock (i.e., a timer or the like) that generates timestamp data (e.g., authentication data 204) for each iteration of input data (e.g., input data 206A-206N) received.

In some examples, the encryption signature generation component 104 may, at least in part, be stored on a system on a chip (SoC) (e.g., the key provider component 458 as described below with reference to FIG. 4) of the electronic camera 102 or the like. For example, the encryption signature generation component 104 may be a module of a secure element (e.g., the key storage component 460) of the SoC. Further, the module (e.g., defining the encryption signature generation component 104) may be configured to facilitate the functionalities for generating and applying encryption signatures to data blocks as described herein. It should be understood that while reference is made herein to the encryption signature generation component 104 performing the described operations using video data (e.g., as input data 206A-206N), the operations described for the encryption signature generation component 104 may be applied to other forms of data (e.g., text files, executable files, financial data, personally identifiable data, and/or the like).

Now that examples of the architecture and operating environment of the encryption signature generation component 104 have been described above, non-limiting example processes for generating and applying encryption signatures to data blocks will be described below with reference to FIG. 2. It should be understood that the non-limiting example processes described below with reference to FIG. 2 may further include some or all of the example processes described herein with reference to FIGS. 5A-5B.

As shown in FIG. 2, the encryption signature generation component 104 may initialize one or more processes for generating and applying encryption signatures to data blocks in response to receipt of one or more unsigned data blocks 213 and/or other command data (e.g., command data 456 described below with reference to FIG. 4). In some examples, input data (e.g., input data 206A-206N) may comprise one or more of unsigned data blocks 213. As shown, the encryption signature generation component 104 may receive or generate an initialization vector (IV) 202. The initialization vector 202 may be a starting variable for a cryptographic function (e.g. a block cipher). In some examples, the initialization vector 202 may be a byte code (e.g., 16-bytes long or any other length) that is randomly, or pseudo-randomly, generated based, at least in part, on a trigger event. In some examples, the initialization vector 202 may not be a multiple of 16-bytes and, in such examples, one or more padding techniques may be performed to include additional bytes into a data block, data block group, or data stream. In some examples, the initialization vector 202 may be unique to each trigger event and may persist for the length of video recording (or data generation) associated with a respective trigger event. In some examples, the initialization vector 202 may be periodically generated or re-generated, for example, based at least in part on an elapsed time (e.g., every 24 hours or any other time period).

The encryption signature generation component 104 may further receive or generate authentication data 204. The authentication data 204 may be any additional data (e.g., metadata) associated with a trigger event, one or more unsigned data blocks 213, and/or one or more data input (e.g., any or all of input data 206A-206N). Examples of authentication data may include, without limitation, a byte code, timestamp data, a camera or electronic device identifier (e.g., serial number, unique ID, etc.), an abstraction of one or more identifiers, and/or any other data that may be utilized by a verifying peer (e.g., remote media server 112 and/or any other computing device comprising the encryption signature verification component 114) to authenticate any or all of signed data blocks 214. In some examples, the encryption signature generation component 104, using a system clock or timer algorithm, may generate timestamp data for each of input data 206A-206N. The timestamp data may be unique to each of input data 206A-206N and may be representative of a time when each of input data 206A-206N were received, generated, and/or encoded by, for example the electronic camera 102. Moreover, the verifying peer that receives any signed data blocks comprising the timestamp data may compare the timestamp data (e.g., after decryption with a public key) to a current time in order to confirm that a received data stream (of signed data blocks) is live, current, and/or consistent with other data blocks within the stream. In some examples, the verifying peer may comprise a system clock that is synchronized with the system clock of the encryption signature generation component 104 up to a time tolerance (e.g., ±5 seconds, within a tolerance of ±10%, or any other length of time or tolerance percentage). It should be understood that two or more synchronized system clocks may require an allowable time tolerance when verifying timestamp data in order to account for clock drift and/or any time inaccuracies caused by processor and/or transmission delay associated with the signed data blocks.

In some examples, the encryption signature generation component 104 may prepend the initialization vector 202 and/or the authentication data 204 to one or more of the unsigned data blocks 213 to produce input data (e.g., one or more of input data 206A-206N). For example, as described above, the electronic camera 102 may provide video data (i.e., unsigned data blocks 213) to the encryption signature generation component 104. Further, the encryption signature generation component 104 may generate an initialization vector 202 and/or authentication data 204 and prepend the first data block of the unsigned data block 213 to produce first input data (i.e., input data 206A). In some examples, each data block of the unsigned data block 213 may correspond to particular data input (e.g., at least one of input data 206A-206N) and the initialization vector 202 and/or the authentication data 204 may be associated with, at least, the first input data (e.g., input data 206A) (corresponding to a first unsigned data block) during a hash process (e.g., using hash algorithm 207).

In some examples, the encryption signature generation component 104 may further prepend additional data to one or more of the unsigned data blocks 213 to produce input data (e.g., one or more of input data 206A-206N). In such examples, the additional data may include a flag or identifier indicating which hash algorithm 207 (as described below) is used by the encryption signature generation component 104 to generate the encryption signature 212. Still the additional data may include any other data or information as described herein. In some examples, the encryption signature generation component 104 may generate a container (e.g., data object, file, etc.) separate from the encryption signature 212 and/or the signed data blocks 214. The container may be encrypted (e.g., using private key 210 or the like) and the container may comprise the initialization vector 202, authentication data 204, and/or any additional data described herein. In some examples, the electronic camera 102 and/or the encryption signature generation component 104 may transmit the encrypted container, via communication network 110, to a verifying peer (e.g., remote media server 112 or the like). In some examples, the encrypted container may be transmitted to the verifying peer with the signed data blocks 214 and/or independently of the signed data blocks 214 (e.g., out-of-band, via a separate communication channel of the communication network 110, or the like).

As shown in FIG. 2, the encryption signature generation component 104 may include a hash algorithm 207. The hash algorithm 207 may be a secure hash algorithm (SHA) and/or may comprise one or more mathematical hash functions. Example hash algorithms may include, without limitation, one or more of SHA-0, SHA-1, SHA-2 (e.g., SHA-256, SHA-512, etc.), SHA-3 (e.g., SHA3-256, SHAKE 256, etc.) and/or any other SHA-family algorithms or variants thereof. Each of the one or more mathematical hash functions of an SHA may be configured to receive data (e.g., any of input data 206A-206N, initialization vector 202, authentication data 204, and/or other data as described herein) and transform the received data into hash data (e.g., any hash data 208A-208N). In some examples, the hash data (e.g., any hash data 208A-208N) may be a digest or other type algorithm output. The hash data (e.g., any hash data 208A-208N) may comprise one or more fixed-length hash values further comprising a string of bytes defining a binary code, numeric values, and/or alphanumeric values.

In some examples, such as illustrated, the first input data (e.g., input data 206A), the authentication data 204, and the initializations vector 202, may be input into the hash algorithm 207. Further, the hash algorithm 207 may output first hash data (e.g., hash data 208A). The first hash data (e.g., hash data 208A) may be re-input into the hash algorithm 207 with second input data (e.g., input data 206B) to further produce second hash data (e.g., hash data 208B. As shown in FIG. 2, the hash algorithm 207 may iteratively perform the hash process for each instance of input data (e.g., input data 206B-2026N) received in addition to the first input data (e.g., input data 206A). In some examples, each iteration of the hash process (e.g., in addition to the first) may utilize the preceding hash data (e.g., the last digest or output generated using hash algorithm 207 for the same trigger event) as input data for the current iteration. For example, as shown, the hash data 208A and the input data 206B are utilized by the hash algorithm 207 to produce the hash data 208B. Further, the hash data 208B and the input data 206C are utilized by the hash algorithm 207 to produce the hash data 208C. In some examples, the hash algorithm 207 may transform the current input data (e.g., 208B) using the one or more mathematical hash functions and combine the current output with the preceding hash data (e.g., hash data 208A) to produce a hash index or hash table. In such examples the preceding hash data (e.g., hash data 208A) is not utilized by the one or more mathematical hash functions as an input; however, the hash algorithm 207 may compile the current output with the preceding hash data (e.g., hash data 208A) to produce combined hash data (e.g., hash data 208B).

As shown, the hash algorithm 207 may process all of the input data (e.g., all of input data 206A-206N) to produce final hash data or unencrypted hash data (e.g., hash data 208N) associated with the unsigned data blocks 213. The encryption signature generation component 104 may utilize the final or unencrypted hash data (e.g., hash data 208N), the private key 210, and/or the initialization vector 202 to produce the encryption signature 212. For example, the encryption signature generation component 104 may use the private key 210 and the initialization vector 202 to encrypt the final or unencrypted hash data (e.g., hash data 208N). In some examples, the encryption signature generation component 104 may encrypt the final or unencrypted hash data (e.g., hash data 208N) using one or more cryptographic techniques and/or one or more block cipher modes of operation (e.g., symmetric encryption ciphers, asymmetric encryption, AES-CBC mode, AES-SIV mode, AES-GCM-SIV mode, and/or the like). In examples of asymmetric encryption the initialization vector may no longer be required. In some such examples, the hash algorithm 207 (and/or like) may use one or more other unique values (e.g., byte codes, words, numeric codes, alphanumeric codes, and/or the like) in place of the initialization vector. In some examples, the hash algorithm 207 may use timestamp data and/or other authentication data (as described herein) instead of an initialization vector. In some such examples, the verifying peer (or verifying node) may detect and/or enforce sequential timestamp data. In some examples, if multiple data streams (e.g., an audio track and a video track of a video stream) are being signed in parallel (e.g., using the process 500 as described below with reference to FIG. 5) then an initialization vector may be used to compare and/or verify the multiple data streams (e.g., using the process 600 as described below with reference to FIG. 6). For example, a verifying device or system may verify that an audio stream and a video stream include the same initialization vector in order to confirm that the audio stream is properly associated with the video stream. In some examples, the encryption signature generation component 104 may prepend additional data to the final or unencrypted hash data (e.g., hash data 208N) before the final or unencrypted hash data is encrypted.

The encryption signature 212 may be used by encryption signature generation component 104 to sign one or more data blocks of the unsigned data blocks 213. In some examples, the encryption signature generation component 104 inserts the encryption signature 212 into at least one data block of a data block group. As shown in FIG. 2, the signed data blocks 214 are segmented data block groups 216A-216N and the encryption signature 212 (represented by an "x") is inserted into the last data block (e.g., data blocks 218A-218N) of each of data block groups 216A-216N. In some examples, data block groups 216A-216N may comprise any number of data blocks (e.g., 1, 5, 20, etc.). In some examples, the encryption signature 212 may be inserted into (or used to sign) any one or more data blocks in a data block group (e.g., the first data block, the last data block and/or any intermediate data blocks). In some examples, the signed data blocks 214 may comprise at least one data block group comprising at least one signed data block. In some examples, the signed data blocks 214 may be the same or similar to the signed data block(s) 106A as described above with reference to FIG. 1.

In some examples, the encryption signature generation component 104 may further comprise a parser component (e.g., parser component 304 as described below with reference to FIG. 3) for segmenting or parsing a data stream into one or more subcomponents (e.g., data blocks, data block groups, or other subcomponents described herein). In some examples, the signed data blocks 214 may be segmented by the encryption signature generation component 104 in order to maintain approximately equivalent size (e.g., within a tolerance of ±5% or another number) data block groups with respect to a time interval (e.g., 1 second, 1 minute, or the like within a tolerance of ±5% or another number). In some examples, the signed data blocks 214 are segmented by the encryption signature generation component 104 based on the occurrence of video parameter sets that results in approximately equivalent size (e.g., within a tolerance of ±5% or another number) data block groups that correspond approximately to keyframes (e.g., within a tolerance of ±1 frame or another number). For example, a signed data block of signed data blocks 214 may be a GoP with the keyframe of the GoP including the encryption signature. In some examples, audio data may be segmented based on number of blocks per group (e.g., 1, 5, etc.) and/or a requirement to maintain approximately equivalent size (e.g., within a tolerance of ±5% or another number) data block groups. In some examples, the audio data (e.g., of a video) may be segmented to produce audio data block groups approximately equivalent size (e.g., within a tolerance of ±5% or another number) to the image data block groups (e.g., of the same video), or vice versa.

In some examples, a data stream comprising the unsigned data blocks 213 may be generated, a first unsigned data block group may be processed by hash algorithm 207, and that first unsigned data block group may be signed with a first encryption signature. Further, one or more additional unsigned data block groups may be processed by hash algorithm 207, and each additional unsigned data block group may be signed with a respective encryption signature. For example, as shown in FIG. 2, a data stream comprising the unsigned data blocks 213 may be segmented (e.g., by the electronic camera 102, the encryption signature generation component 104, or the like) into data block groups (as described above for the signed data blocks 214), for example, as the requisite amount of data blocks are received and before being processed by the hash algorithm 207. In such examples, the hash algorithm 207 may iteratively process each data block (e.g., as described above for input data 206A-206N) of the unsigned data block groups to produce corresponding signed data block groups (e.g., data block groups 216A-216N). In some examples, the hash algorithm 207 may repeat or "loop" through all of the unsigned data block groups of a video stream (or the like) and produce an unencrypted hash data (e.g., hash data 208N) for each unsigned data block group (e.g., using at least the same initialization vector (e.g., initialization vector 202) for each "loop"). In some examples, the encryption signature (e.g., encryption signature 212) for each signed data block group (e.g., any of data block groups 216A-216N) may be specific or unique to that particular data block group because the input data used to generate the encryption signature may be specific or unique to that particular data block group.

For example, as shown in FIG. 2, each of data block groups 216A-216C may be signed using an encryption signature produced by a respective "loop" of the hash algorithm 207. For example, the four data blocks of data block groups 216A (prior to being signed) may be input (e.g., as described above for input data 206A-206N) into hash algorithm 207 to produce a first encryption signature which may then be used to sign data block 218A, the four data blocks of data block groups 216B (prior to being signed) may be input into hash algorithm 207 to produce a second encryption signature which may then be used to sign data block 218B, the four data blocks of data block groups 216C (prior to being signed) may be input into hash algorithm 207 to produce a third encryption signature which may then be used to sign data block 218C, and this process may continuously "loop" (e.g., to produce an $N^{th}$ encryption signature used to sign data block 218N) until the stream of unsigned data blocks ceases to be received by the encryption signature generation component 104 (e.g., electronic camera 102 stops recording video). In some examples, the encryption signature generation component 104 may serially (e.g., in a series or sequence) process data block groups post-encoding. For example, after a data block group is encoded the encryption signature generation component 104 may receive and process (e.g., as described herein) the encoded data block group (e.g., while another data block group is being encoded).

In some examples, the encryption signature 212 may be inserted into a header of a data block. For example, data blocks associated with video data encoded in accordance with H.264 (or AVC) or H.265 (or HEVC) formats may comprise one or more network abstraction layer (NAL) units (NALUs). Further, each NALU may comprise a NALU type indicative of how a respective NALU should be parsed. An example NALU type which may be supported by both AVC and HEVC may be the supplemental enhancement information (SEI) type. In some examples, the SEI type may be reserved for various forms of data that may not be used by a parser (e.g., metadata representative of how a video was encoded, playback data, film grain characteristics, etc.). In some examples, each SEI NALU may also comprise a respective SEI type which may be specified in SEI header of the SEI NALU, such as the "USER_DATA_UNREGISTERED" SEI type which may be configured to specify user defined data and/or data including a universally unique identifier (UUID). In some examples, the encryption signature 212 may be inserted into the header of a data block using the "USER_DATA_UNREGISTERED" SEI type. In some examples, the encryption signature 212 may be inserted into the header of a data block using another SEI NALU type, NALU type, another data encoder specification type, and/or the like. In some examples, any additional data that is prepended to (or included in) the final or unencrypted hash data (e.g., hash data 208N as described above) before the final or unencrypted hash data is encrypted, may be inserted into a SEI NALU type, and/or indicated by a UUID, that is different from the SEI NALU type, and/or the UUID, utilized for the encryption signature 212. In such examples, the additional data that is prepended to (or included in) the final or unencrypted hash data may be identified and/or utilized by a verifying peer (e.g., separate from the encryption signature).

It should be appreciated that the "USER_DATA_UNREGISTERED" SEI type may be configured to be ignored by at least some specification-adherent parser algorithms because the "USER_DATA_UNREGISTERED" SEI type may be irrelevant with respect to playback of a video. Accordingly, the inclusion of the encryption signature 212 in the "USER_DATA_UNREGISTERED" SEI type may not interfere with video playback. Further, the "USER_DATA_UNREGISTERED" SEI type may be removed by at least some transcoders that are not explicitly configured to identify the "USER_DATA_UNREGISTERED" SEI type and preserve the "USER_DATA_UNREGISTERED" SEI type. Accordingly, in some examples, attackers attempting to alter (or transcode the format of) video data signed via the "USER_DATA_UNREGISTERED" SEI type may unknowingly remove, break, or otherwise invalidate the encryption signature 212 stored in the "USER_DATA_UNREGISTERED" SEI type without affecting playback of the altered video. Therefore, inserting the encryption signature 212 into the "USER_DATA_UNREGISTERED" SEI type may prevent an attacker from receiving any indication or feedback that they invalidated, at least in part, that encryption signature 212.

It should be understood that once the encryption signature 212 is removed, broken, or otherwise invalidated as described herein any associated data blocks (e.g., video stream) may not be verified or authenticated by the encryption signature verification component 114. It should also be appreciated that if a modification is made to a signed data block (e.g., video data or the like) then the encryption signature will no longer be valid for authenticating the modified data block (or a data block group associated therewith) even if an attacker manages to preserve the original encryption signature in the "USER_DATA_UNREGISTERED" SEI. Further, the original signature will no longer be valid for authenticating the modified data block because the modified data block when input into a hash algorithm (as described herein) will not produce (or reproduce) the same hash data of the original encryption signature. In some examples, one or more encryption signatures may be inserted into one or more audio data transport stream (ADTS) frames of an advanced audio coding (AAC) audio track. In such examples, data block group splitting may be done by a counter (e.g., counting a number of frames and/or data blocks), or timer (e.g., counting time interval lengths between inserting encryption signatures). It should be understood that a counter or timer may be useful for signing audio tracks because some audio tracks (e.g., ADTS frames) may use common data throughout the track (e.g., as opposed to a specific header for a frame or data block).

Now that examples of system 100 and the encryption signature generation component 104 have been described above with reference to FIG. 1 and FIG. 2 respectively, further examples of the encryption signature verification component 114 will now be described below with reference to FIG. 3.

Figure 3:
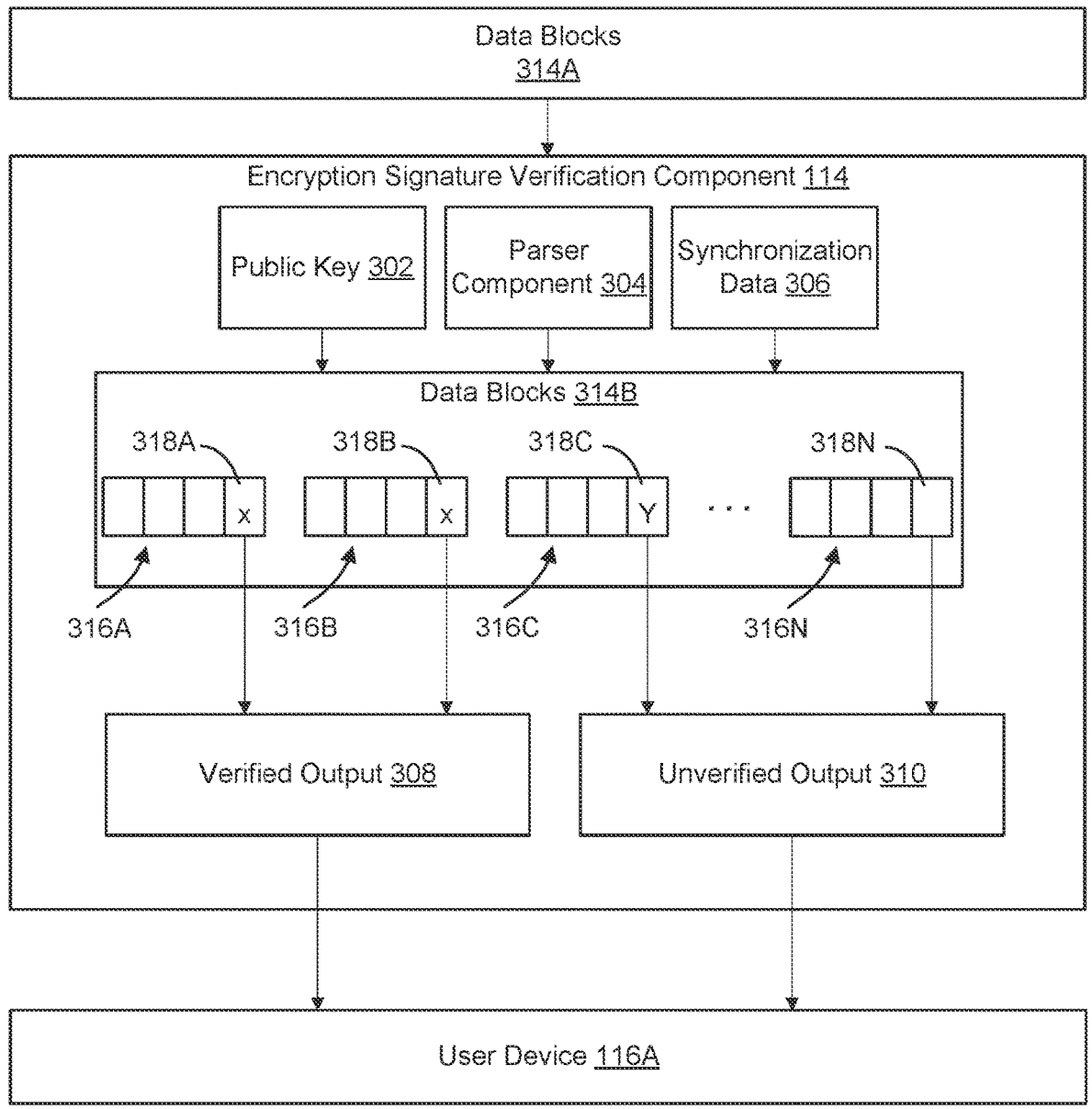
FIG. 3 illustrates example components for verifying the authenticity of signed data blocks, in accordance with various aspects of the present disclosure.

FIG. 3 is a diagram illustrating at least an example of the encryption signature verification component 114 for verifying the authenticity of signed data blocks, in accordance with various aspects of the present disclosure. The encryption signature verification component 114 may be hosted by one or more computing devices and/or electronic devices as described herein, such as remote media server 112 as shown in FIG. 1. As shown, the encryption signature verification component 114 may receive (e.g., via at least in part the communication network 110) the data blocks 314A. In some examples, the encryption signature verification component 114 may receive one or more data streams comprising one or more data blocks and/or one or more data block groups. Non-limiting examples of the data blocks 314A may include, at least in part, one or more of the unsigned data block(s) 108, the signed data block(s) 106B, the signed data blocks 214, a portion thereof, and/or any other data as described herein. For example, the encryption signature verification component 114 may receive a container (as described above with reference to FIG. 2) comprising the initialization vector 202, authentication data 204, and/or any additional data described herein with the data blocks 314A and/or independently of the data blocks 314A (e.g., out-of-band, via a separate communication channel of the communication network 110, or the like).

As shown, the encryption signature verification component 114 may include one or more of a public key 302, a parser component 304, and/or synchronization data 306. In some examples, the public key 302 may be the same or similar to the key 462B described below with reference to FIG. 4. In some examples, the encryption signature generation component 104 may provide the public key 302 to the encryption signature verification component 114, for example, during an enrollment or registration process between the electronic camera 102 and the remote media server 112. In some examples, the encryption signature generation component 104 may associate a particular public key (e.g., public key 302) with a particular computing device (e.g., electronic camera 102 or the like), such as via reference table or other database that maps one or more public keys to one or more computing devices. For example, the encryption signature generation component 104 may identify the computing device that provided data blocks 314A (e.g., via an IP address, MAC address, UUID, serial number, handshake protocol, and/or the like) and then lookup one or more public keys associated with the identified computing device. The encryption signature generation component 104 may use the one or more public keys associated with the identified computing device to decrypt, at least in part, the data blocks 314A and/or any encryption signature contained by the data blocks 314A (e.g., encryption signature 212). In some examples, any or all public keys may be stored in a secured database accessible to the encryption signature verification component 114. In some examples, the system 100 may use symmetric-key algorithms and/or symmetric encryption ciphers, for example, instead of a public key 302 and a private key 210, the same shared key (e.g., symmetric key) may be used for both encryption and decryption. For example, the encryption signature verification component 114 and the encryption signature generation component 104 may each use the same or similar cryptographic keys (e.g., copies of a shared key pair, or the like). In v examples, the encryption signature verification component 114 may generate, or derive, the private key 210, the public key 302, the shared key, and/or any or all of keys 462A-462N (e.g., for one or more recording sessions, time intervals, a trigger event, and/or the like) as described herein.

The parser component 304 may comprise one or more hardware (e.g., circuitry or the like) and/or software (e.g., an algorithm, an executable neural semantic parser, or the like) components as described herein that identify and/or segment or parse data (e.g., data blocks 314A) into subcomponents. Example subcomponents that may be identified and/or segmented by the parser component 304 may include, without limitation, one or more of bytes, frames, audio tracks, image (i.e., video) tracks, code elements, tokenized text, SEI headers of SEI NALUs, and/or any other discrete data units described herein). The parser component 304 may utilize one or more of a processor and/or memory (e.g., of the remote media server 112 or the like) to retrieve or access the data blocks 314A, a copy of the data blocks 314A, and/or a predefined data set (e.g., training data used to train a parser algorithm to segment the data blocks 314A). In some examples, the parser component 304 may comprise one or more machine learning models comprising an unsupervised model, a supervised model, an artificial neural network (e.g., a feedforward artificial neural network, probabilistic artificial neural network, perceptron, multilayer perceptron, convolutional neural network (CNN), or the like), decision tree, executable neural semantic parser, and/or any other machine learning techniques described herein.

In some examples, the parser component 304 may comprise one or more rule-based parsing algorithms. The one or more rule-based parsing algorithms may parse data based on one or more predefined rules or instructions. For example, a rule-based parsing algorithm may scan each data block group or data block 314A to determine a SEI NALU type which may indicate how the content of a particular data block or data block group should be parsed. Additionally, or alternatively, a rule-based parsing algorithm may scan each data block group or data block 314A to determine whether an encryption signature identifier is present. The encryption signature identifier may indicate whether an encryption signature (e.g., encryption signature 212) is present. The parser component 304 may determine not to parse a data block or data block group without the encryption signature identifier (e.g., to conserve available computing resources and/or reduce processing times or delays). In some examples, the data blocks 314A may be encoded using H.264 (or AVC) or H.265 (or HEVC). In such examples, the encryption signature identifier may be provided, at least in part, via one or more "USER_DATA_UNREGISTERED" SEI NALU type data blocks that may be configured to specify user defined data and/or data including a universally unique identifier (UUID). In some examples, the encryption signature identifier and/or the encryption signature 212 may be inserted into the header of a data block using the "USER_DATA_UNREGISTERED" SEI NALU type. In some examples, a custom, non-standard, or new specification based SEI NALU type and/or the like may be utilized to provide, at least in part, the encryption signature identifier and/or the encryption signature 212. An example of a custom, non-standard, or new specification based SEI NALU type may be "SIGNATURE_VERIFICATION," "SIGNED VERIFY," "DEVICEVERIFICATION," and/or the like.

As shown in FIG. 3, the encryption signature verification component 114 may include synchronization data 306 which may be compared to data or information of the data blocks 314A (e.g., authentication data 204 or the like). The synchronization data 306 may be generated by the encryption signature verification component 114, such as by using a system clock (i.e., a timer or the like) that generates timestamp data that may be compared to timestamp data (e.g., authentication data 204). In some examples, synchronization data 306 may be used to verify the timestamp data (e.g., authentication data 204) up to a time tolerance (e.g., ±5 seconds, within a tolerance of ±10%, or any other length of time or tolerance percentage). For example, authentication data 204 may indicate a timestamp of 12:30:56 and corresponding synchronization data (e.g., synchronization data 306) may indicate a timestamp of 12:30:54. Further, the encryption signature verification component 114 may determine, based at least in part on a time tolerance, that the authentication data 204 may be verified (e.g., as authentic) because it does not deviate from the synchronization data 306 by more than the defined time tolerance. In some examples, the timestamp data may comprise one or more standardize formats, such as in accordance with ISO 8601 and/or another regulation or standard. For example, timestamp data may include one or more indications of a time, time zone (e.g., Eastern Time (ET), UTC-5:00/-4:00, etc.), daylight savings time (DST) (e.g., Eastern Daylight Time (EDT), UTC-4:00, etc.), date, day, week, month, year, scale (e.g., 24-hours, 12-hours, etc.), or the like. For example, timestamp data in accordance with the ISO 8601 standard may comprise a date, time, and time zone, such as 2024-01-16T12: 06:08-07:00 and/or the like. In some examples, authentication data 204 may be verified (e.g., as authentic) if the time difference between the authentication data 204 and the synchronization data 306 is equal to or less than the defined time tolerance. In some examples, a time tolerance may be determined for an electronic device (e.g., electronic camera 102 or the like) and/or computing device by the encryption signature verification component 114 during an enrollment or registration process. In some examples, a time tolerance may be stored in a secured database accessible to the encryption signature verification component 114 (e.g., the same or similar secured databased that stores one or more public keys as described above).

In some examples, data blocks 314A may be time-coded video data, where each data block may be associated with video time interval such as a video start time (e.g., time stamp data and/or keyframe indicating a start time), a video end time (e.g., time stamp data and/or keyframe indicating an end time), and/or the like. In some examples, the authentication data 204 and/or the synchronization data 306 may be relative to a global clock and/or a local system clock of the electronic camera 102, the remote media server 112, and/or any other computing device.

Now that examples of the architecture and operating environment of the encryption signature verification component 114 have been described above, non-limiting example processes for verifying the authenticity of signed data blocks will be described below with reference to FIG. 3. It should be understood that the non-limiting example processes described below with reference to FIG. 3 may further include some or all of the example processes described herein with reference to FIG. 6.

As shown in FIG. 3, the encryption signature verification component 114 may initialize one or more processes for verifying the authenticity of one or more signed data blocks in response to receipt of one or more data blocks (e.g., data block 314A) and/or other command data (e.g., command data 456 described below with reference to FIG. 4). The encryption signature verification component 114 may further receive or generate synchronization data 306 in response to receipt of one or more data blocks (e.g., data block 314A). In some examples, the encryption signature verification component 114 may receive a container (e.g., data object, file, etc.) comprising additional data as described above.

The encryption signature verification component 114 may use the parser component 304, as described above, to scan (i.e., read) any unencrypted data provided via the data blocks 314A. For example, the parser component 304 may scan a header of a first data block containing an electronic device identifier to the identify a computing device that may have provided data blocks 314A. The encryption signature verification component 114 utilize the electronic device identifier to retrieve one or more public keys associated with the identified computing device (e.g., from a secured database).

In some examples, after scanning the data blocks 314A, the encryption signature verification component 114 may determine that the data blocks 314A do not include an electronic device identifier, an encryption signature (e.g., encryption signature 212), and/or any other data that may be required for a verification process as described herein. In such examples, the encryption signature verification component 114 may generate and/or cause transmission of an unverified output 310 (e.g., to a user device 116A) indicating that, at least in part, the authenticity of the data blocks 314A cannot be verified. The unverified output 310 may be one or more of a text message or graphical red "X" icon displayed via the user device 116A via a companion application. In some examples, upon detection of the unverified output 310, a verifying peer (e.g., any computing device hosting the encryption signature verification component 114) may block the transmission of the data blocks 314A (e.g., the playback of an un-authenticatable video stream may be blocked from being displayed via the user device 116A). In some examples, upon detection of the unverified output 310, a verifying peer (e.g., any computing device hosting the encryption signature verification component 114) may allow the transmission of the data blocks 314A (e.g., once the user of user device 116A acknowledges, via the companion application, that they understand the data blocks 314A).

In an instance the encryption signature verification component 114 determines that the data blocks 314A do include the data required to at least initialize one or more verification processes as described herein then the encryption signature verification component 114 may retrieve the public key 302 and decrypt, at least in part, the data blocks 314A to produce the data blocks 314B. In some examples, decrypting the data blocks 314A may comprise decrypting any or all encryption signatures (e.g., encryption signature 212) and/or other components of the data blocks 314A. It should be understood that as shown in FIG. 3, data of the data blocks 314A may be similar or the same as the data of the data block 314B.

In some examples, the data blocks 314B (via their encryption signature(s)) may include one or more of an initialization vector (e.g., initialization vector 202), authentication data (e.g., authentication data 204), hash data (e.g., any or all of hash data 208A-208N), a flag or an identifier indicating which hash algorithm (e.g., hash algorithm 207) was used to produce one or more encryption signatures (e.g., encryption signature 212), and/or any other data described herein. In some examples, the encryption signature verification component 114 may store any or all data from the data blocks 314B in memory for further processing and/or performing one or more operations described herein.

As shown in FIG. 3, the data blocks 314B comprise the data block groups 316A-316N which are segmented into groups of four data blocks. Further, as shown, data block groups 316A-316B each comprise a respective and authentic encryption signature (e.g., encryption signature 212 which is represented by an "x"). Within data block group 316A the authentic encryption signature (e.g., which may be specific or unique to data block group 316A) is contained in the last data block of the group (i.e., data block 318A). Within data block group 316B the authentic encryption signature (e.g., which may be specific or unique to data block group 316B) is contained in the last data block of the group (i.e., data block 318B).

In some examples, the encryption signature verification component 114 may comprise, in whole or in part, the encryption signature generation component 104. In such examples, the encryption signature verification component 114 may perform one or more processes described herein in association with the encryption signature generation component 104 in order to re-create (or attempt to re-create) one or more encryption signatures (e.g., encryption signature 212). In some examples, the computing device (e.g., remote media server 112 or other verifying peer) that is hosting the encryption signature verification component 114 may also host a version or copy of the encryption signature generation component 104 as described above with reference to FIG. 1 and FIG. 2.

The encryption signature verification component 114 may utilize, at least in part, one or more of the initialization vector, the authentication data, the hash data, one or more hash algorithms, and/or the like (e.g., as determined from data blocks 314B) to produce one or more encryption signatures for comparison to one or more of the encryption signatures contained in the data blocks 314B. As shown in FIG. 3, the data block groups 316A-316B each include an authentic encryption signature represented by an "x" in the data blocks 318A-318B. Further, the data block group 316C includes a forged (or at least partially broken) encryption signature represented by a "Y" in the data block 318C. Furthermore, the data block group 316C includes a broken (or missing) encryption signature represented by the data block 318N missing the "x" and "Y" indicators as described above.

It should be appreciated that the data block groups 316A-316B each illustrate non-limiting examples where the encryption signature associated with each respective data block group may be verified. In such examples, the encryption signature verification component 114 may input the data block group 316A and/or any associated (e.g., prepended) initialization vector, authentication data, and/or the like into one or more hash algorithms in order to re-create (or attempt to re-create) the one or more encryption signatures associated with data block 318A. Further, the one or more re-created encryption signatures may be, at least temporarily, stored as synchronization data (e.g., synchronization data 306) and compared to the one or more encryption signatures of the data block 318A in order to determine the authenticity of the data block group 316A. In the illustrated example, the encryption signature verification component 114 may determine that the one or more re-created encryption signatures matches (e.g., completely or to within a tolerance of ±1%, 5%, or any other tolerance to account for data loses) the one or more encryption signatures of the data block 318A and the encryption signature verification component 114 may generate and/or cause transmission of a verified output 308 (e.g., to a user device 116A) indicating that, at least in part, the authenticity of the data block group 316B can be, or was, verified. It should be understood that a tolerance may be utilized during the comparison process to account for data losses that may occur, such as during transmission or processing of the data blocks 314A. The verified output 308 may be one or more of a text message, graphical green "check" icon, and/or the like displayed via the user device 116A via a companion application. In some examples, upon detection of the verified output 308, a verifying peer (e.g., any computing device hosting the encryption signature verification component 114) may allow the transmission of the at least data block group 316B (e.g., the playback of an authenticatable video stream may be displayed via the user device 116A). Moreover, after processing the data block group 316B the encryption signature verification component 114 may further input the data block group 316B and/or any associated initialization vector, authentication data, and/or the like into one or more hash algorithms in order to re-create (or attempt to re-create) the one or more encryption signatures of the data block 318B. Similar to the process described above for data block group 316A, the one or more re-created encryption signatures may be stored as synchronization data (e.g., synchronization data 306), compared to the one or more of the encryption signatures of the data block 318B, and may be determined to be verifiable (e.g., resulting in a verified output 308).

It should be appreciated that the data block group 316C may illustrate non-limiting examples where the encryption signature associated with a data block group may have been tampered with, or damaged, by an attacker during transmission. In some examples, the data block group 316C may illustrate non-limiting examples where an electronic device temporarily lost connectivity (e.g., to the Internet) and the difference in timestamp data is greater than a time tolerance. In such examples, the encryption signature verification component 114 may input the data block group 316C and/or any associated initialization vector, authentication data, and/or the like into one or more hash algorithms in order to re-create (or attempt to re-create) the one or more encryption signatures associated with data block 318C. Further, the one or more re-created encryption signatures may be, at least temporarily, stored as synchronization data (e.g., synchronization data 306) and compared to the one or more encryption signatures of the data block 318C in order to determine the authenticity of the data block group 316C. In the illustrated example, the encryption signature verification component 114 may determine that the one or more re-created encryption signatures do not match (e.g., to within a tolerance of ±5%, 10%, or any other tolerance) the one or more encryption signatures of the data block 318C and the encryption signature verification component 114 may generate and/or cause transmission of an unverified output 310 (e.g., to a user device 116A) indicating that, at least in part, the authenticity of the data block group 316C cannot be, or was not, verified. The unverified output 310 may be one or more of a text message or graphical red "X" icon displayed by the user device 116A via a companion application or the like. For example, a text message may be displayed on a companion application in association with a thumbnail or other representation of the video and/or of the portion of the video corresponding to the unverified output 310. An example text message may state "The authenticity of this portion of the video is unable to be verified" or similar. In some examples, upon detection of the unverified output 310, the encryption signature verification component 114 may block the transmission of at least the data block group 316C of the data blocks 314B. For example, the encryption signature verification component 114 may prevent or block the playback of a video of the data blocks 314B. In some examples, upon detection of the unverified output 310, the encryption signature verification component 114 may allow the transmission of at least the data block group 316C of the data blocks 314B. For example, the encryption signature verification component 114 may allow the playback of a video of the data blocks 314B upon receipt of acknowledgment data (e.g., from the user device 116A) indicating that the user of the user device 116A understands that the video may not be authenticate because the video could not be verified.

It should be appreciated that the data block group 316N may illustrate non-limiting examples where a data block group does not include any encryption signature. In some examples, a data block group may not include any encryption signature because the signature may never have been generated, such as when data blocks are generated by a third-party device (e.g., authorized third-party and/or unauthorized or counter field third-party devices). In some examples, a data block group may not include any encryption signature because the signature may have been removed by an attacker, such as if the attacker replaces authentic data blocks in a data stream. In such examples, the encryption signature verification component 114 may scan or read data from a header of the data block 318N (e.g., data stored in the "USER_DATA_UNREGISTERED" SEI NALU type or the like). Further, the encryption signature verification component 114 may determine that the header of the data block 318N does not contain an electronic device identifier and/or an encryption signature (e.g., at least not in the correct SEI NALU type or the like) and may generate and/or cause transmission of an unverified output 310. In some examples, the unverified output 310 may comprise indication data (e.g., text message, etc.) indicating that the authenticity of a data stream (or portion thereof) cannot be verified and/or other indication data (e.g., text message, etc.) indicating the reason (e.g., because the encryption signature may be, at least in part, missing, broken, a forgery, and/or the like) that the authenticity of a data stream (or portion thereof) cannot be verified.

Now that various example architectures and processes associated with the system 100 for generating and verifying data blocks incorporating an encryption signature have been described above with reference to FIGS. 1-3, further examples of electronic devices that may be used in the system 100 and/or to perform one or more processes described herein will now be described in further detail below with reference to FIG. 4.

FIG. 4 depicts examples of an electronic device 401 that may be, in whole or in part, an electronic camera, a server, a computing device, a component thereof, a combination thereof and/or the like as described herein. It should be understood that the examples of electronic device 401 shown in FIG. 4 are non-limiting examples and various blocks or states may be added to or removed from the disclosed examples. For example, a server (e.g., remote media server 112) represented by the electronic device 401 may not include, in some examples, the imaging device(s) 408 and/or the speaker(s) 418. Additionally, or alternatively, a mobile device (e.g., user device 116A) and/or electronic camera (e.g., electronic camera 102) represented by the electronic device 401 may include a global position system (GPS) receiver (not shown) for receiving and/or decoding GPS data (e.g., used to identify the location of video data or the like).

As shown, the electronic device 401 may include one or more of processor(s) 403, network interface(s) 404, motion sensor(s) 402, lighting device(s) 412, input/output device(s) 414, power source(s) 416, speaker(s) 418, microphone(s) 420, imaging device(s) 408, memory 422, and/or system on a chip (SoC). In some examples, the electronic device 401 may be an example of an electronic camera, such as electronic camera 102 as shown and described in reference to FIG. 1. In other examples, electronic device 401 may be any computing device and/or server capable of generating one or more data blocks (whether associated with a video data format or another data format such as text files).

Motion sensor(s) 402 may include or be communicatively coupled with one or more (alone or in combination) different types of motion sensors as described herein. In some examples, the motion sensor(s) 402 may comprise passive infrared (PIR) motion sensors, which may be secured on (or within) a sensor holder that may reside behind a lens (e.g., a Fresnel lens or the like). In some examples, a PIR sensor may be configured to identify motion within the PIR sensor's fields-of-view by, at least in part, detecting infrared (IR) radiation emitted by objects, humans, animals, and/or a background environment. For example, a PIR sensor may determine when an object (or the like) passes through the PIR sensor's field-of-view by detecting the IR radiation emitted by the object, detecting the IR radiation emitted by the background environment, comparing the object's IR radiation to any IR radiation emitted by the background environment (within the PIR sensor's fields-of-view), and determining differential changes in the IR radiation detected throughout the PIR sensor's field-of-view (e.g., over a period of time).

In some examples, a PIR sensor may comprise two pyroelectric sensing elements electrically coupled together with opposite polarization to produce an output. In this way, an equal change in temperature at both of the pyroelectric sensing elements will cancel out in the output signal, thus filtering out temperature changes in the environment. However, a change in temperature at only one of the pyroelectric sensing elements will result in an output signal that is positive or negative (depending on which pyroelectric sensing element experienced the change in temperature). In some examples, the PIR sensor may include two slots, each providing an optical path to one of the pyroelectric sensing elements. A PIR sensor may comprise one or more lenses configured to direct light received at the one or more lenses onto one of the pyroelectric sensing elements. A PIR sensor may include one or more lenses configured to direct light received at a first portion of the one or more lenses (e.g. a left portion) onto a first of the pyroelectric sensing elements (e.g. a left sensing element), and to direct light received at a second portion of the one or more lenses (e.g. a right portion) onto a second of the pyroelectric sensing elements (e.g. a right sensing element). The one or more lenses may comprise one or more Fresnel lenses having one or more features configured to direct light.

In some examples, the PIR sensor may be analog, with an analog signal output, or may be digital, with digital data output generated utilizing an analog-to-digital converter (ADC) (e.g., output from the ADC or output generated based on output from the ADC). In some examples, a plurality of PIR sensors may be utilized, and each PIR sensor may output respective signals (or sensor data) and the electronic device 401 may use a signal signature (i.e., a characteristic unique to each signal) to determine which PIR sensor detected an object. The characteristic may include a voltage, an amplitude of a wave, an angle of the wave, and/or other characteristics representative of a respective signal. In some examples, detection of a trigger event by a PIR sensor may be facilitated by one or more thresholds (e.g., a threshold magnitude of differential change between one or more PIR sensors or portions of a PIR sensor).

In some examples, the motion sensor(s) 402 may comprise one or more radio frequency (RF) motion sensors (i.e., radar sensors). In some examples, a radar sensor may comprise a transceiver configured to transmit and receive radio signals. For example, a radar sensor may use a frequency modulated continuous wave (FMCW) approach where a set of one or more frequency modulated chirps are transmitted by the transceiver, reflected off of a surface within the radar sensor's field-of-view (e.g., off of an object, human, animal, and/or the like), and are received back by the transceiver. The received (or returning) signals may be utilized to determine distances to objects by comparing the frequencies of the transmitted and/or returning signals at a given time. For example, transmitted and returning signals may be utilized to determine a difference between each instantaneous signal frequency at a given time in order to determine a Doppler frequency which may be used to detect distance, movement, and/or velocity associated with a reflection surface (e.g., associated with an object, human, etc.). In some examples, a radar sensor may include an additional antenna which may allow the position (or coordinates) of an object (or the like) to be triangulated.

Moreover, motion sensor(s) 402 may comprise a primary and a secondary motion sensor. In some examples, the secondary motion sensor may be used to corroborate a detection signal of the primary motion sensor. For example, a primary PIR sensor may detect a car passing through the PIR sensor's field-of-view and a secondary RF sensor may be used to corroborate detection of motion by a PIR sensor. It should be understood that the primary sensor's field-of-view may, at least in part, overlap with the secondary sensor's field-of-view in order for the secondary sensor to corroborate the detection signal of the primary sensor (or vice versa). In some examples, video analytics in camera systems (e.g. using a machine learning model) may be used to corroborate motion detection of a primary motion sensor.

In some examples, the output data of a PIR sensor and a radar sensor may be fused and input into a machine learning model (e.g., a supervised machine learning model, unsupervised machine learning model, etc.) that may be used to determine whether motion is detected in the monitored environment and/or whether a trigger event has occurred. The machine learning model may be trained using annotated training data that provides examples of positive motion events and negative motion events (together with the attending PIR and radar data). In some examples, radar data may include one or more radar data blocks that may be included and/or signed in a data stream (e.g., a signed radar data block and/or the like as described herein). Accordingly, the machine learning model may learn common false positive and false negative scenarios and may thereby provide more accurate and useful motion detection.

Machine learning techniques, such as those described herein, are often used to form predictions, solve problems, recognize objects in image data for classification, etc. In some examples, machine learning models may perform better than rule-based systems and may be more adaptable as machine learning models may be improved over time by retraining the models as more and more data becomes available. Accordingly, machine learning techniques are often adaptive to changing conditions. Deep learning algorithms, such as artificial neural networks, are often used to detect patterns in data, emerging patterns, and/or perform tasks. Generally, in machine learned models, such as artificial neural networks, parameters control activations in neurons (or nodes) within layers of the machine learned models (e.g., artificial neural networks). The weighted sum of activations of each neuron in a preceding layer may be input to an activation function (e.g., a sigmoid function, a rectified linear units (ReLu) function, etc.). The result determines the activation of a neuron in a subsequent layer. In addition, a bias value can be used to shift the output of the activation function to the left or right on the x-axis and thus may bias a neuron toward activation. To train a machine learning model, a cost or "loss" function may be utilized that describes the difference between expected output of the machine learning model and actual output. Parameters (e.g., weights and/or biases) of a machine learning model may be updated based on annotated training data to minimize (or maximize) the cost. For example, the machine learning model may use a gradient descent (or ascent) algorithm to incrementally adjust the weights to cause the most rapid decrease (or increase) to the output of the loss function. The method of updating the parameters of the machine learning model is often referred to as back propagation. In some examples, back propagation may include an algorithm that back propagates an error value from the output nodes backwards through a machine learning model (e.g., artificial neural network) toward the input nodes. Further, the parameters (e.g., weight values and/or functions that relate node between layers) are adjusted in order to compensate for the known error value and minimize (or maximize) the error value. Back propagation may be performed iteratively to continuously reduce the error value produced by a machine learning model, e.g., based on various known outputs.

As previously described, a PIR sensor may detect IR radiation within its field-of-view and produce an output signal (typically a voltage) that changes as the amount of IR radiation in the field-of-view changes. The amount of voltage in the output signal may be compared, by the processor(s) 403, for example, to one or more threshold voltage values to determine if the amount of voltage in the output signal is indicative of motion, and/or if the amount of voltage in the output signal is indicative of motion of an object that is to be captured by the imaging device(s) 408. In some examples, the processor(s) 403 may determine the distance based on the amount of voltage in the output signal. In some examples, the processor(s) 403 may determine the distance based on which motion sensor(s) 402 (e.g., PIR, radar, etc.) detected the object.

Although the above discussion of the motion sensor(s) 402 primarily relates to PIR sensors, depending on the example, the motion sensor(s) 402 may include additional and/or alternate sensor types that produce output signals including alternative data types (e.g., binary signals, gradient signals, voltage, current, resistance, etc.). For example, and without limitation, the output signal may include an amount of voltage change based at least in part on the presence of infrared radiation in a field-of-view of an active infrared (AIR) sensor, the output signal may include phase shift data from a microwave-type radio frequency motion sensor, the output signal may include Doppler shift data from an ultrasonic-type motion sensor, the output signal may include radio wave disturbance from a tomographic-type motion sensor, and/or the output signal may include other data types for other sensor types that may be used as the motion sensor(s) 402. In at least some examples, the motion sensor(s) 402 may include a radar sensor and/or PIR sensor. A radar sensor may include a transmitter, two or more receivers (e.g., with corresponding antennas), a mixer, an ADC, and/or other electronics configured to perform the various operations described herein. In some examples, circuitry may be included in the electronic device 401 and/or in the image signal processor 446 that may be effective to perform the various motion detection techniques described herein. In some examples, a PIR sensor, radar sensor, and/or other motion sensor(s) may be used to perform coarse motion detection and once a trigger event is detected other sensing techniques (e.g., facial recognition, object recognition, etc.) may be triggered (e.g., to track a human or object and/or to determine when to end a video stream). For example, an electronic device 401 may begin recording video when a delivery truck drives into a sensor's field-of-view, the truck may park but a driver's face may be detected as a human face (e.g., object of interest) and the recording may continue. Further, the drive may deliver a package and drive away and if the driver's face remains undetected (e.g., by a facial recognition algorithm) for a threshold period of time the recording may stop (e.g., even if objects not of interest are still moving such as trees swaying in the wind).

Imaging device(s) 408 may include any device that includes an image sensor 444 that is capable of generating the image data 426 (which may represent, and/or include, the frames of image data described herein), representing one or more images (e.g., frames of a video). Example image sensors (e.g., 444) may include, without limitation, a charge-coupled device (CCD), an active-pixel (CMOS) sensor, the like, or combinations thereof. The imaging device(s) 408 may include a lens 438 that is effective to focus light on the image sensor 444. The light may be filtered by a red, green, blue (RGB) color filter array (CFA) 440 (e.g., a Bayer CFA) or an RGB-IR CFA. In one aspect of the present disclosure, the image sensor 444 may comprise a complementary metal-oxide semiconductor (CMOS) array and may be capable of recording high definition (e.g., 722p, 1800p, 4K, 8K, etc.) image and/or video files (e.g., data block groups). The image sensor 444 may comprise a plurality of photosensors (or photoelectric sensors) that may transform light into electrical signals. Such electrical signals may be represented by numerical values (e.g., floating point numbers) that may be processed using the image signal processor 446. Each photosensor of the image sensor 444 corresponds to a pixel in a frame of image data captured by the image sensor. In other words, the light information captured by the image sensor is represented as pixel values (e.g., a respective pixel value captured by each photosensor/pixel of the image sensor). Accordingly, each pixel in a frame of image data typically corresponds to one photosensor and the pixels in a frame are likewise arranged in a grid. The pixel value of each pixel represents the light captured by the corresponding photosensor during image capture.

In some examples, the image sensor may be coated with a dual band-pass filter that has a passband at about 900 nm to allow IR color reproduction during the day and also to allow IR light detection when the imaging device(s) 408 operate in a night mode. In some examples, the electronic device 401 may include an IR cut filter 442 to filter out infrared light from the light path of the photosensors when the electronic device 401 operates in a day mode. The IR cut filter 442 may be removed from the light path such that infrared light may reach the photosensors when the electronic device 401 operates in a night mode.

Moreover, the imaging device(s) 408 may include a separate image signal processor (e.g., image signal processor 446), or the processor(s) 403 may perform the camera processing functionality. The processor(s) 403 (and/or camera processor) may include an encoding and compression chip. In some examples, the processor(s) 403 (and/or the camera processor) may comprise a bridge processor. The processor(s) 403 (and/or the camera processor) may process video recorded by the image sensor and may transform this data into a form suitable for transfer by the network interface(s) 404. In some examples, the imaging device(s) 408 also includes memory, such as volatile memory that may be used when data is being buffered or encoded by the processor(s) 403 (and/or the camera processor). For example, the camera memory may comprise synchronous dynamic random-access memory (SD RAM), static RAM, and/or the like.

The lighting device(s) 412 may be one or more light-emitting diodes capable of producing visible light and/or infrared light when supplied with power (e.g., to enable night vision). In some examples, when activated, the lighting device(s) 412 illuminates a light pipe. In some examples, the electronic device 401 uses the lighting device(s) 412 to illuminate specific components of the electronic device 401, such as the Input/output device(s) 414. This way, users are able to easily see the components when proximate to the electronic device 401.

Input/output device(s) 414 may include, without limitation, one or more input devices, such as a button, a touch-sensitive surface (e.g., a touch screen), a switch, a slider, and/or any other type of device that allows a user to provide input to the electronic device 401. For example, if the electronic device 401 includes a doorbell, then the Input/output device(s) 414 may include a doorbell button. In some examples, based on receiving an input, the processor(s) 403 may receive a signal (e.g., electrical signal, interrupt signal, etc.) from the Input/output device(s) 414 and use the signal to determine that the Input/output device(s) 414 received an input. Additionally, the processor(s) 403 may generate input data representing the input received by the Input/output device(s) 414. For example, the input data may represent the type of input (e.g., a push to a button), a time that the input occurred (e.g., timestamp when the button when pushed), a length of time (e.g., a button was pushed and held for 5 seconds), and/or the like. In some examples, Input/output device(s) 414 may be associated with a computing device (e.g., mobile phone, user device 116A, etc.) communicatively coupled to the electronic device 401 such as via a communication network. For example, the Input/output device(s) 414 may include a mobile phone touchscreen, graphical buttons in a companion application, a keyboard, a mouse, and/or any other input device associated with a computing device. In some examples, input/output device(s) 414 may include, without limitation, one or more output devices, such as a screen, light-emitting diode (LED), and/or any other type of display device that allows a user to receive one or more visual outputs from the electronic device 401.

The power source(s) 416 may include one or more batteries that provide power to the electronic device 401. In some examples, the electronic device 401 may not include the power source(s) 416. In such examples, the electronic device 401 may be powered using a source of external alternating-current (AC) power, such as a household AC power supply which may have a voltage in the range of, for example, 112-220 VAC. The incoming AC power may be received by an AC/DC adapter, transformer, and/or the like, which may convert the incoming AC power to direct-current (DC) and may step down the voltage from 112-220 VAC to a lower output voltage of about 12 VDC and an output current of approximately, for example, 2 Amperes (A). In some examples, the output of the AC/DC adapter is in a range from about 9 Volts (V) to about 15 V and in a range from about 0.5 A to about 5 A. These voltages and currents are examples provided for illustration and not intended to be limiting. In some examples, the power source(s) 416 may include one or more solar photovoltaic cells for generating electrical energy from sunlight and/or other lighting sources.

In some examples, electronic device 401 may be operated in a low power state (e.g., sleep or standby mode) prior to detection of motion to conserve the power source(s) 416. In some examples, during the low power state, the imaging device(s) 408 may capture and store a limited amount of video in a rolling buffer (e.g., reserved portion of memory 422), with the oldest portions of the video in the rolling buffer being deleted as video from the current time is stored. In some examples, when the electronic device 401 detects a trigger event one or more operations may be initiated as described below, such as encoding, encrypting, and/or streaming video (e.g., including audio and/or image data) to one or more other computing devices for storage, distribution, display, and/or further processing. For example, the contents of the rolling buffer may be encoded and sent to a server (e.g., remote media server 112) followed by a stream of video captured by the electronic device 401 during the period that trigger event is detected. Waiting until a trigger event is detected prior to capturing and/or streaming image data and/or video data may prolong battery life (and minimize power consumption) by capturing, encoding, and/or streaming video, e.g., only in response to detecting a trigger event. For example, in a surveillance context, video segments that do not depict motion and/or which represent trivial motion (e.g., leaves blowing in the wind) may not be of sufficient interest to a user of the camera system to warrant continuous video capture and/or streaming. In such motion-triggered video streaming architectures (as described above), video data that is streamed to the cloud (e.g., a remote server) as a result of a trigger event may be stored in association with additional data indicating the type of triggering event (e.g., metadata representing motion detection, object detection, a doorbell button press, an input from a companion application, etc.). Data representing one or more triggering events may also be provided to a companion application (e.g., displayed via a graphical user interface where each type of trigger event is associated with a respective text message and/or graphical icon). In some examples, a user may select a particular trigger event using a user interface of the companion application to initialize streaming of the captured video associated with that respective triggering event. In some examples, a user may select or deselect one or more types of trigger events using the user interface of the companion application to initialize capture of video based on selected triggering events and/or prevent capture of video based on deselected triggering events.

The speaker(s) 418 may be any electromechanical device capable of producing sound in response to an electrical signal input. The microphone(s) 420 may be an acoustic-to-electric transducer or sensor capable of converting sound waves into audio data 430 representing the sound. The speaker(s) 418 and/or microphone(s) 420 may be coupled to an audio CODEC to enable digital audio received by user devices to be decompressed and output by the speaker(s) 418 and/or to enable audio data captured by the microphone(s) 420 to be compressed into digital audio data (e.g., audio data 430). In some examples, the electronic device 401 includes the speaker(s) 418 and/or the microphone(s) 420 so that the user associated with the electronic device 401 can communicate with one or more other users located proximate to the electronic device 401. For example, the microphone(s) 420 may be used to generate audio data representing the speech of the one or more other users, which is then sent to the electronic device 401 and/or the like (e.g., electronic camera 102). In some examples, the speaker(s) 418 may output user speech and the user speech may be represented by audio data 430.

In some examples, the electronic device 401 determines that the start of the video is the first frame of the video. In some examples, the electronic device 401 may continuously generate image data (e.g., the electronic device 401 does not turn off the imaging device(s) 408). In some examples, the electronic device 401 does not continuously generate the image data 426 (e.g., the electronic device 401 operates in a sleep mode and/or turns off the imaging device(s) 408 until a stimulus is received, e.g., detecting a trigger event such as a motion of an object or person). Further, the start of the video may correspond to the first frame of the video that is generated by the imaging device(s) 408. It should be understood that the first frame, last frame, and/or any intermediate frames within a video may be keyframes which define one or more of the start, end, and/or a transitional point within the video data. For example, the first frame may be a keyframe that defines the start of the video, a middle frame (e.g., halfway through the video, etc.) may be a keyframe that defines a transition in video parameters (e.g., a transition from recording in day mode to night mode), and the last frame may be a keyframe that defines the end of the video.

As further illustrated in the example of FIG. 4, the electronic device 401 may include the computer-vision component 448. The computer-vision component 448 may analyze the image data 426 using one or more computer-vision techniques and output the computer-vision data 450 based on the analysis. The computer-vision data 450 may represent any data or information as described herein. For example, the computer-vision data 450 may include image data (e.g., 426) that represents the presence of an object in a field-of-view of a motion sensor or imaging device. Further, the computer-vision data 450 may include metadata that indicates a location and/or type of object represented by image data. For example, the metadata may indicate locations (e.g., angles, distances, coordinates, and/or the like) of objects relative to the electronic device 401 that generated the image data. Moreover, the computer-vision data 450 may include data or information indicating a direction of movement, velocity, acceleration, and/or any other type of information associated with an object (e.g., represented in a video). As described herein, an object may include, without limitation, a person/human, animal (e.g., dog, cat, bird, mouse, etc.), vehicle, tree, wall, package, door, window, and/or any other type of object. In some examples, the computer-vision data 450 may further represent a bounding box indicating a respective location of each object (e.g., detected by motion sensor(s) 402, a recognition/video analytics algorithm, and/or the like) represented by the image data 426. It should be understood that the image data 426, alone or in combination with audio data 430, may define a video or video data as described herein.

In some examples, the computer-vision component 448 may analyze the image data 426 using one or more computer-vision techniques such as, but not limited to, object detection technique(s), object tracking technique(s), semantic segmentation technique(s), instance segmentation technique(s), object co-segmentation techniques, and/or any other computer vision technique(s). Computer-vision analysis may include methods for acquiring, processing, analyzing, and/or understanding digital images, such as by extracting high-dimensional data from the real world in order to produce numerical or symbolic information. This information is then used to identify object(s) represented in the image, locations of the object(s), a respective velocity of each object, and/or the like. High-dimensional data may refer to data that is predicted, calculated, and/or infer from data collected by the electronic device 401, a component (e.g., sensor) thereof, and/or other computing devices that may capture data and provide the data to the electronic device 401.

For a first example of performing computer-vision analysis, the computer-vision component 448 may use image segmentation technique(s) that use the computer-vision analysis to locate objects and boundaries (e.g., lines, curves, etc.) in images. Image segmentation may further assign labels to the segments, where segments that include the same label also include the same characteristics. As described herein, the one or more image segmentation techniques may include, but are not limited to, clustering technique(s), compression-based technique(s), histogram-based technique(s), edge detection technique(s), dual clustering technique(s), multi-scale segmentation technique(s), and/or any other type of image segmentation technique that may be use to segment the frame(s) of the video. In some examples, computer-vision component 448 may evaluate one or more cropped activity zones that include detected motion using one or more motion detection techniques described herein. In some examples, upon detecting an object of interest in the cropped activity zone, the electronic device may begin encoding and transmitting captured video to one or more remote devices.

Compression-based technique(s) may be any data compression techniques that reduce the amount of bytes associated with data (e.g., a file, image, etc.). Compression-based technique(s) may find patterns, or predict emerging patterns (e.g., with machine learning techniques) in data (e.g., an image, video track, audio track, and/or the like) and any repeating patterns, statistical redundancies, and/or regularities in the data may be compressed. The compression-based technique(s) may describe each segment (e.g., portion) by its texture and boundary shape. In some examples, each segment (or component thereof) may be modeled by a probability distribution function and its coding length. The goal of the compression-based technique(s) is to find the segment (or component thereof) which produces the shortest coding length. This may be achieved by a simple agglomerative clustering method.

Histogram-based technique(s) may compute a histogram from all of the pixels in the image. In some examples, one or more peaks, valleys, and/or other values in the histogram may be used to locate the clusters (e.g., portions) in the image. In some instances, color and intensity can be used as the measure of the clusters. In some instances, the histogram-based technique(s) may recursively apply the histogram-seeking method to clusters in the image in order to divide the clusters into smaller clusters. This operation may be repeated until no more clusters are formed.

Edge detection technique(s) may utilize region boundaries and/or edges that may be closely related. It should be understood that it may be easier to group or cluster data based on edge detection technique(s) because there may often be a sharp adjustment in intensity (e.g., color, brightness, etc.) at the region boundaries of images (or other data types). For example, an image of a black crow flying in front of a white cloud may be detected with a high degree of certainty using edge detection technique(s) because the black pixels of the crow may create a strong contrast edge next to the white pixels of the cloud. As such, the edge detection technique(s) use the region boundaries to segment an image (e.g., based on detected objects). In some instances, the edge detection technique(s) may use the image sensor 444, or the like, to identify the region boundaries.

Dual clustering technique(s) uses a combination of three characteristics of an image: partition of the image based on histogram analysis is checked by high compactness of the clusters, and high gradients of their borders. The dual clustering technique(s) use two spaces, one space is a one-dimensional histogram of brightness and a second space is a dual three-dimensional space of the original image. The first space allows the dual clustering technique(s) to measure how compactly the brightness of the image is distributed by calculating a minimal clustering. The clustering technique(s) use the two spaces to identify objects within the image and segment the image base, at least in part, on the detected objects.

For a second example of performing computer-vision analysis, the computer-vision component 448 may use one or more object detection technique(s) that use computer-vision analysis to perform informative region selection, features extraction, and then classification of object(s) represented by the image data 426. Informative region selection may include selecting different portions (e.g., windows) of an image represented by the image data for analysis. Feature extraction may then include extracting visual features of the object(s) located within the portions of the image in order to provide a semantic and robust representation of the object(s). Finally, classification may include classifying the type(s) of object(s) based on the extracted features for the object(s). In some examples, the object detection technique(s) may include machine learning technique(s), such as a Viola-Jones object detection technique, a scale-invariant feature transform technique, a histogram of oriented gradients features technique, the like, and/or any other machine learning technique(s) described herein. In some examples, the object detection technique(s) may include one or more deep learning approaches including, without limitation, region proposal technique(s) (e.g., convolutional neural network (CNN) technique(s)), you only look once technique(s), deformable convolutional networks technique(s), and/or the like.

The electronic device 401 may also store the command data 456. In some examples, a user of the electronic device 401 may want to receive a live view (e.g., real-time video stream) from the electronic device 401. The command data 456 may represent an identifier associated with the electronic device 401, a command to generate the image data 426 and/or audio data 430, a command to record and/or transmit the image data 426 and/or audio data 430 (e.g., to a server, user device, and/or the like as described herein), a command to initialize one or more processes and/or operations as described herein, and/or the like. In some examples, the electronic device 401 may then analyze the command data 456 and, based on the identifier, determine that the command data 456 is directed to the electronic device 401. For example, the electronic device 401 may match the identifier represented by the command data 456 to an identifier associated with, and stored by, the electronic device 401. Further, the electronic device 401 may cause the imaging device(s) 408 to begin generating the image data 426 (e.g., if the imaging device(s) 408 are not already generating the image data 426) and record and/or transmit the image data 426 to one or more computing devices as described herein.

As used herein, a processor (e.g., processor(s) 403 or the like) associated with one or more computing devices may include multiple processors and/or a processor having multiple cores. Further, the processor(s) may comprise one or more cores of different types. For example, the processor(s) may include application processor units, graphic processing units, and so forth. In one instance, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SoCs), complex programmable logic devices (CPLDs), etc. Additionally, each of the processor(s) may possess its own local memory, which also may store program components, program data, and/or one or more operating systems.

As used herein, memory 422 may be any non-transitory computer-readable memory. In some examples, memory 422 may include volatile and nonvolatile memory, removable and non-removable media implemented in any method or technology for storage of information, such as computer-readable instructions, data structures, program component, and/or other types of data described herein. The memory 422 may include, without limitation, RAM, ROM, EEPROM, flash memory (or other memory technology), compact disks (CD), digital versatile disks (DVD) (or other optical storage), magnetic cassettes, magnetic tape, magnetic disk storage (or other magnetic storage), redundant array of independent disks (RAID) storage systems, and/or any other medium which can be used to store the desired data and which can be accessed by a computing device. The memory 422 may be implemented as computer-readable storage media (CRSM), which may be any available physical media accessible by the processor(s) to execute instructions stored on the memory. For example, the memory 422 or the like may store instructions that may be effective to perform one or more of the various techniques described herein. In some examples, CRSM may include random access memory (RAM) and flash memory. In some examples, CRSM may include, without limitation, read-only memory (ROM), CD-ROMs, electrically erasable programmable read-only memory (EEPROM), or any other tangible medium which can be used to store the desired information and which can be accessed by one or more processors. In some examples, memory devices/systems as described above may be included as a component of a computing device and may be directly accessible by that particular computing device (or a computing device communicatively coupled thereto). In some examples, memory devices/systems as described above may be remotely accessible to one or more computing devices (e.g., via a communication channel of a communications network). For example, memory devices/systems may include cloud storage that may be accessed by a user of a computing device via the Internet using authentication credentials (e.g., a login, password, 2-step verification, and/or other authentication techniques).

Further, functional components may be stored in the memory 422 (e.g., as software, executable instructions, and/or the like), or the same functionality may alternatively be implemented in hardware, firmware, application specific integrated circuits, field programmable gate arrays, or as a system on a chip (SoC). In addition, the memory 422 may include at least one operating system (OS) component that is configured to manage hardware resource devices such as the network interface(s), the I/O devices of the respective apparatuses, and so forth, and provide various services to applications or components executing on the processor(s). Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network interface(s) 404 may enable data to be communicated between electronic devices. The network interface(s) 404 may include one or more network interface controllers (NICs) or other types of transceiver devices to send and receive messages over network(s). For instance, the network interface(s) 404 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth®), IEEE 802.11 (Wi-Fi), or any other PAN message protocol. Furthermore, the network interface(s) 404 may include a wide area network (WAN) component to enable message over a wide area network.

Key provider component 458, as shown, may include a key storage component 460 and one or more keys (e.g., any or all of keys 462A-462N). In some examples, the key provider component 458 may include one or more of a dedicated processor, dedicated memory, an interface to processor(s) 403, an interface to memory 422, software or processor executable instructions (e.g., a hardware cryptographic engine), and/or the like as described herein to facilitate the generation, storage, transmission, and/or provisioning of one or more of cryptographic keys (e.g., any or all of keys 462A-462N and/or the like as described herein). In some examples, the key provider component 458 may include, at least in part, a System on a Chip (SoC). In some such examples, an SoC may comprise an integrated circuit (IC) that includes, at least in part, a secure element, a private key (e.g., key 462A or the like), a public key (e.g., key 462B or the like), and/or one or more shared key pairs (e.g., any or all of keys 462A-462N and/or the like as described herein). In some examples, the key provider component 458 may comprise processor executable instructions (and/or any software, firmware, or hardware features described herein) for performing one or more operations described below with reference to FIGS. 5A-5B and/or FIG. 6. In some examples, the key provider component 458 may generate (or derive) one or more cryptographic keys (e.g., any or all of keys 462A-462N). In some such examples, any or all of keys 462A-462N may be derived keys that are specific to a particular session (e.g., of video recording, data generation, and/or the like). For example, the key provider component 458 may comprise a key derivation function (KDF) including one or more cryptographic algorithms (or the like as described herein) for deriving one or more keys (e.g., any or all of keys 462A-462N) from one or more secret values, such as a master key, a password, authentication data (e.g., timestamp data, an initialization vector, and/or the like), and/or any other passphrase (e.g., using a random and/or pseudorandom function, such as a hash function and/or block cipher as described herein). In some examples, the key provider component 458, using at least a KDF, may derive one or more keys from timestamp data, sensor measurement data (e.g., atmospheric data, temperature, etc.), and/or the like on the fly (e.g., in response to detecting trigger event or the like as described below with reference to the operation 502 of the process 500). In some examples, the key provider component 458 may derive one or more keys periodically (e.g., every hour, 24 hours, and/or any other time interval of continuous video recording).

Key storage component 460 may comprise one or more memory devices (e.g., memory 422, and/or other storage devices) to at least temporarily store one or more keys (e.g., any or all of keys 462A-462N). In some examples, the key storage component 460 may comprise a secure element of an SoC (e.g., key provider component 458) and/or any other secured memory (e.g., encrypted storage device and/or the like). In some such examples, the secure element may comprise at least a portion of the SoC that has been secured against unauthorized tampering using one or more software features (e.g., cryptographic techniques, isolated execution environment, etc.), firmware features, and/or hardware features (e.g., hardware-based memory encryption). For example, the secure element may be configured to isolates specific application code and data in on-board memory (e.g., of the SoC, the key provider component 458, and/or the like in order to block access from unauthorized applications that may be executed on a host device (e.g., electronic device 401). In some examples, the SoC may, at least in part, be encrypted or may be configured with other physical or tamper-resistant features to provide hardware-level security. For example, one or more hardware components of secure element may prevent or block any and all software applications from accessing privileged resources stored within the secure element without a signed security certificate and/or private key. In some examples, secure element may comprise a trusted execution environment (TEE) and/or may include modular programming techniques. In some examples, the key storage component 460 may be accessible to the key provider component 458 but may not be included in the key provider component 458. In some such examples, the key storage component 460 may, at least in part, be a remote storage device, or other computing device external to the key provider component 458, that is communicatively coupled to the electronic device 401 via a communication network.

In some examples, modular programming techniques may include, without limitation, decoupling the functionalities associated with the key storage component 460 (e.g., a secure element) into small independent modules of self-contained components (of hardware, software, and/or firmware) comprising everything necessary to execute a respective operation. Further, each independent modules may only be capable of performing a respective operation which reduces the likelihood that a particular module may be compromised/corrupted (e.g., by malicious software instructions). Moreover, each module may be configured to communicate and/or share data with other modules only if the data is transmitted and/or received using secure mechanisms, such as encryption techniques, digital certification, object serialization, proxies, and/or the like.

In some examples, the key storage component 460 (e.g., a secure element), the key provider component 458 (e.g., an SoC), and/or other components of electronic device 401 may, at least in part, be treated with conformal coatings and/or encapsulated (e.g., within a resin, epoxy, urethane, and/or the like) to prevent unauthorized physical tampering. For example, during manufacture the key provider component 458 (e.g., including key storage component 460) may be encapsulated in resin to prevent an attacker from physically accessing, removing, replacing, and/or otherwise physically altering the key provider component 458. It should be understood that attempts to physically access (e.g., by cutting or burning away portions of resin to access hardware components) the key provider component 458 once encased in resin, or the like, may result in physical damage rendering, at least, the key provider component 458 (or a component thereof) inoperable. Further, because of the physical damage an attacker may be unable (or less likely) to extract and/or replace the key 462A (e.g., a private key), the key 462B (e.g., a public key), and/or any other components of the key provider component 458. For example, if an attacker uses a solvent capable of dissolving the encapsulation material they may corrode the underlying components or circuitry, rendering the key provider component 458 inoperable and any information (e.g., any or all of keys 462A-462N) stored therein inaccessible (or unusable).

Keys 462A-462N may be any numeric or alphanumeric code that may be used with one or more cryptographic techniques to encrypt and/or decrypt computer readable data. In some examples, the key 462A may be a private key (e.g., the same or similar to private key 210 as described above with reference to FIG. 2). In some examples, the key 462A (and/or the like) may be unique or specific to each unit of electronic device 401 produced by a particular manufacturer. For example, with reference to FIG. 1, if a plurality of electronic cameras (e.g., the same or similar to electronic camera 102) are communicatively coupled to the remote media server 112 then each of the electronic cameras may utilize a different private key (e.g., only known to that particular electronic camera) to generate signed data blocks. In some examples, the key 462A (and/or any or all of the keys 462B-462N) may be stored in a secure element of an SoC at the time of manufacture of the electronic device 401. In some examples, electronic device 401 may never transmit the key 462A and the key 462A may never be stored to any location (e.g., hard drive, RAM, etc.) external to the electronic device 401. In some examples, once stored to the electronic device 401 the key 462A may be unrecoverable. In some examples, a computing device may generate the key 462A using one or more cryptographic algorithms (e.g., of key derivation function (KDF) as described above) based on one or more mathematical one-way functions. It should be understood that a one-way function may be easy for a computing device to compute an output based on every input but that may be difficult for a computing device to invert in order to determine the inputs for a random output). In some examples, the key 462A may be half of a key pair (e.g., a shared key pair, a public-private key pair, and/or the like) that includes the key 462B (e.g., the same or similar key to the key 462A, a public key, or the like). In some examples, the same or a similar cryptographic algorithm (and/or function) may generate any or all of keys 462A-462N (e.g., using the same or similar one-way functions and/or inputs). In some examples, electronic device 401 may encrypt data using the key 462A (e.g., a private key) and one or more block cipher modes of operation (e.g., AES-CBC mode, AES-SIV mode, AES-GCM-SIV mode, and/or the like).

In some examples, the key 462B may be a public key (e.g., the same or similar to public key 302 as described above with reference to FIG. 3). In some examples, the key 462B (and/or the like) may be unique or specific to each unit of electronic device 401 produced by a particular manufacture. For example, with reference to FIG. 1, if a plurality of electronic cameras (e.g., the same or similar to electronic camera 102) are communicatively coupled to the remote media server 112 then each of the electronic cameras may be associated with a different public key (e.g., sent to remote media server 112 during a device enrollment or registration process). Further, the remote media server 112 may utilize a respective public key of a particular electronic camera to decrypt the signed data blocks associated with the particular electronic camera. In some examples, the electronic device 401 may transmit the key 462B (e.g., a public key) to a computing device during an enrollment or registration process to setup communications between the electronic device 401 and the computing device. Once stored to a computing device the key 462B (e.g., a public key) may be associated with one or more other identified unique to a particular electronic device (e.g., IP address, serial number, etc.). In some examples, a computing device may generate the key 462B (e.g., a public key) using one or more cryptographic algorithms based on one or more mathematical one-way functions (e.g., as described above).

In some examples, the system 100 may utilize asymmetric and/or symmetric encryption techniques (e.g., to generate, or derive, any or all of the keys 462A-462N and/or any other keys as described herein). In some examples of asymmetric encryption, after an electronic device (e.g., electronic camera 102) is setup, enrolled, and/or registered successfully (e.g., with remote media server 112), the electronic device may generate a public key, a private key, a shared key pair, and/or any or all of the keys 462A-462N (e.g., based on an Rivest-Shamir-Adleman (RSA) key pair process, an elliptic-curve cryptography (ECC) process, one or more integer factorization algorithms, a Diffie-Hellman key exchange process, and/or the like), store the key pair to the key storage component 460 (e.g., a secure element of an SoC), and/or cause transmission of the public key to a verifying peer (e.g., remote media server 112 or the like). In some such examples, security certificates (e.g., secure sockets layer (SSL), and/or the like) could be used as a public key and/or a private key. In some examples, the security certificates could be used to verify a communication channel of the communication network (e.g., to verify that the connection used to setup, enrolled, and/or registered an electronic device and provide a public key was not established by an attacker). In some examples of asymmetric encryption, distribution of signed videos may be in the form of MP4s comprising AVC or HEVC video data and/or AAC audio data. In some examples, once audio data and/or video data may be received by a verifying peer, the signature could be recomputed with an electronic device specific key (e.g., public key or the like). In some examples, one or more keys may be used for a respective service (e.g. one or more respective keys may be used for Amazon simple storage service (S3) and/or the like). In such examples, using one or more keys associated with a respective service may allow the verifying peer to cryptographically identify which service a data stream (or video stream) was retrieved from and/or such information could be used as authentication data. In some examples, symmetric encryption may be used. In such examples, the system 100 may use symmetric-key algorithms and/or symmetric encryption ciphers. For example, the electronic device and the verifying peer may each use the same or similar cryptographic keys (e.g., copies of a shared key pair, or the like).

Now that various example architectures and devices associated with the system 100 for generating and verifying data blocks incorporating an encryption signature have been described above with reference to FIGS. 1-4, further example processes for generating and verifying data blocks incorporating an encryption signature will now be described in further detail below with reference to FIGS. 5A-5B and FIG. 6.

Figure 5A:
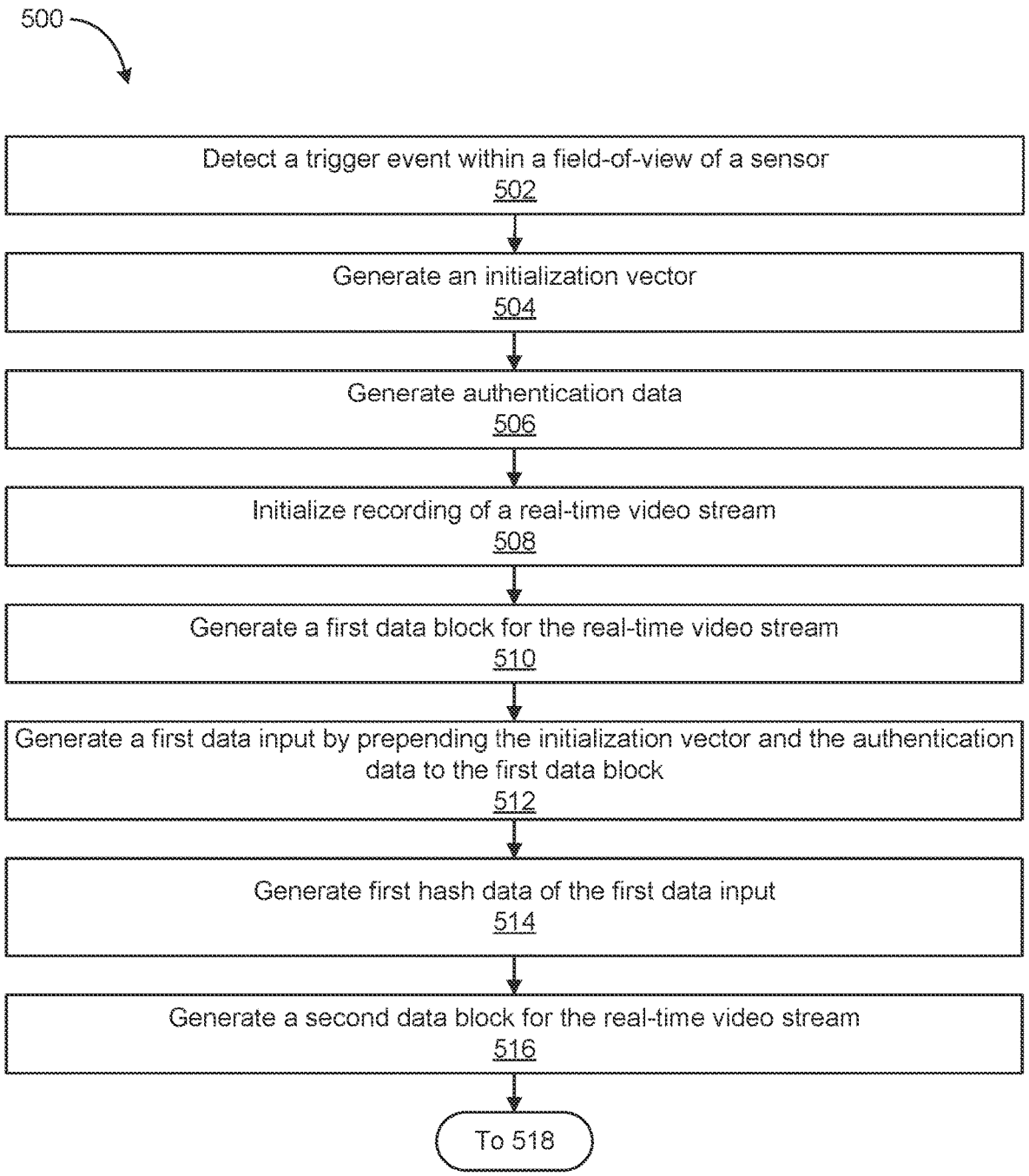
FIG. 5A illustrates an example process for signing data blocks with encryption signatures, in accordance with various aspects of the present disclosure.
Figure 5B:
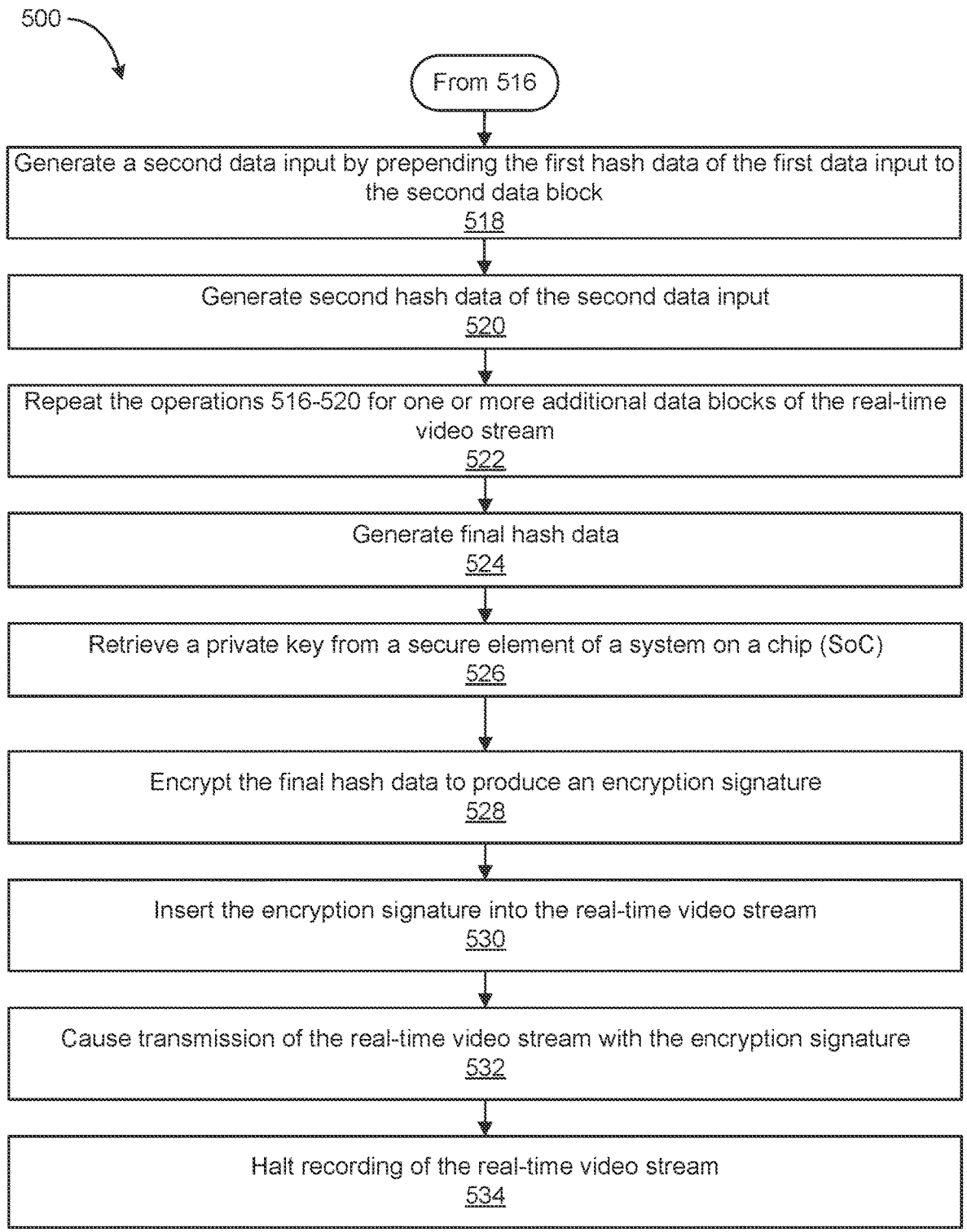
FIG. 5B illustrates an example process for signing data blocks with encryption signatures, in accordance with various aspects of the present disclosure.

FIGS. 5A-5B illustrates an example of the process 500 for signing data blocks with encryption signatures, in accordance with various aspects of the present disclosure. As shown, the process 500 may be used for signing video data, and/or other data, generated by an electronic device 401 (e.g., electronic camera 102, or the like). The operations of the process 500 may represent a series of instructions comprising computer readable machine code executable by a processing unit of one or more computing devices described herein (e.g., electronic device 401, electronic camera 102, and/or any other computing device), although various operations may also be implemented in hardware. In some examples, the computer readable machine codes may be comprised of instructions selected from a native instruction set of at least one processor and/or an operating system of the electronic device. In some examples, the process 500 may be performed by one or more computing devices comprising the encryption signature generation component 104 as described above with reference to FIG. 2.

The process 500 may begin (as shown in FIG. 5A) at operation 502, at which the electronic device 401 (or the like as described herein) may detect a trigger event within a field-of-view (e.g., a field-of-view 120) of a sensor (e.g., motion sensor(s) 402). In some examples, detection of a trigger event may initialize a streaming process that includes the encryption signature generation, e.g., including one or more of operations 504-534 as described below and/or the like as described above with reference to FIGS. 1-4. In some examples, the operation 502 may include receiving, via a communication network (e.g., from a verifying peer, a user device, and/or the like), command data (e.g., a request from a server, a user input, etc.) representative of instructions to begin (e.g., execute, perform, initialize, etc.), at least in part, the process 500. For example, a user of a user device may provide an input (e.g., via a companion application or the like) representative of a request to start streaming video from a camera device to the user device (e.g., mobile phone, etc.). In some examples, the electronic device 401 may be configured to continuously generate a data stream and/or perform, at least in part, the process 500. For example, an electronic camera (e.g., a security camera, etc.) may continuously record or capture video data and transmit a video stream including signed data blocks to a computing device (e.g., storage device, remote media server, user device, etc.). In some such examples, the operation 502 may include activating (e.g., turning on, powering on, installing, restarting, and/or initializing) the electronic device 401. In some examples, the operation 502 may include detecting, via the motion sensor, a trigger event comprising one or more instances of a motion event, object detection, and/or human detection. In some examples, the operation 502 may include detecting, via a motion sensor, a first trigger event comprising one or more instances of a motion event, object detection, or human detection. In some examples, the operation 502 may include detecting, via the motion sensor, a second trigger event comprising one or more instances of another motion event, object detection, or human detection. In some examples, the operation 502 may include detecting a first trigger event and detecting one or more second trigger events with one or more of operations 504-534 performed therebetween. In some examples, the operation 502 may include comparing the output of one or more of motion sensor(s) 402 (image sensor 444, and/or the like as described herein) to one or more thresholds to detect whether a trigger event has occurred. For example, the difference in outputs of two or more PIR sensors may be compared to a threshold magnitude of differential change. In some examples, the operation 502 may include detecting, via at least one processor, one or more generated data signals, data blocks, and/or other command data as described herein to initialize one or more of operations 504-534 as described below and/or the like as described above with reference to FIGS. 1-4.

In some examples, the operation 502 may include completion of an enrollment and/or registration process between the electronic device 401 and/or one or more other computing devices (e.g., user device 116A, remote media server 112, and/or the like). For example, the operation 502 may include causing transmission, via a network interface, of enrollment data representative of instructions to, at least in part, register the electronic device 401 (e.g., electronic camera 102) with a server (e.g., remote media server 112). In some examples, the enrollment data comprises a copy of a public key (e.g., public key 302, keys 462A-462N, and/or the like as described herein) associated with the electronic device 401. In some examples, the operation 502 may include receiving data blocks from one or more second electronic devices. For example, a plurality electronic devices (e.g., security cameras, etc.) may be communicatively coupled (e.g., via Bluetooth®, LAN, or the like) and one or more of the electronic devices may be configured to perform, at least in part, the process 500 for one or more other electronic devices of the plurality electronic devices. In some such examples, at least one electronic device may be configured with the encryption signature generation component 104 (as described above with reference to FIG. 2) and may sign data blocks generated by at least one other electronic device (e.g., an authorized third-party camera, and/or the like) that is not configured with the encryption signature generation component 104. In some examples, a primary electronic device (e.g., a local server, a smart home hub device, and/or another bridge device) may receive data blocks from one or more secondary electronic devices (e.g., computers, smart devices, cameras, etc.) and may perform, at least in part, the process 500 on the received data blocks.

The process 500 may continue at operation 504, at which the electronic device 401 (or the like as described herein) may generate one or more initialization vectors (IVs) (e.g., initialization vector 202). In some examples, the operation 504 may include generating, based at least in part on the trigger event, an initialization vector. In some examples, the initialization vector comprises at least in part a 16-byte code particular to the trigger event. For example, the initialization vector may be a starting variable for a cryptographic function (e.g. a block cipher) which may comprise one or more byte codes (e.g., 16-bytes long or any other length), numeric codes, alphanumeric codes, and/or the like that are randomly, or pseudo-randomly, generated based, at least in part, on the trigger event (e.g., of operation 502). In some examples, the initialization vector may be unique and/or specific to each detected trigger event and may persist for the length of video recording (or data generation) associated with a respective trigger event. For example, a first trigger event may be associated with a first initialization vector and a second trigger event may be associated with a second initialization vector that is not the same byte code (or the like) as the first initialization vector. In some examples, the operation 504 may include determining, for a data block group, an initialization vector. In some examples, at the operation 504, the electronic device 401 (or the like as described herein) may receive one or more initialization vectors, such as from a web service, the key storage component 460, the remote media server 112, and/or any other computing device. In some examples, the operation 504 may include generating a first initialization vector comprising a first unique code particular to the first trigger event. In some examples, the first initialization vector is associated with a first data block group. In some examples, the operation 504 may include generating a second initialization vector comprising a second unique code particular to the second trigger event. In some examples, the second initialization vector is associated with a second data block group.

The process 500 may continue at operation 506, at which the electronic device 401 (or the like as described herein) may generate authentication data (e.g., authentication data 204 or the like). In some examples, authentication data may comprise a byte code, timestamp data, a camera or electronic device identifier (e.g., serial number, unique ID, etc.), an abstraction of one or more identifiers, and/or any other authentication data as described herein. In some examples, at the operation 506, the electronic device 401 (or the like as described herein) may receive authentication data, such as from a web service, the key storage component 460 (e.g., a secure element of an SoC), a global clock and/or a local system clock of the electronic camera 102, the remote media server 112, and/or any other computing device. In some examples, the operation 506 may include generating authentication data comprising one or more of timestamp data (e.g., generated using a global clock and/or a local system clock) and/or an electronic camera identifier (e.g., retrieved and/or received from a secure element and/or the like). In some examples, the authentication data may be unique or specific to one or more data blocks and/or data block groups. For example, the operation 506 may include generating, based at least in part on a first data block of the data block group, first timestamp data. In some examples, the first data block may comprise one or more of first audio data or first image data associated with a first time and/or a first time interval. In some examples, the operation 506 may include generating, based at least in part on a second data block of the data block group, a second timestamp data. In some examples, the second data block may comprise one or more of second audio data or second image data associated with a second time interval.

The process 500 may continue at operation 508, at which the electronic device 401 (or the like as described herein) may initialize recording, encoding, and/or transmission (e.g., using one or more of imaging device(s) 408) of a real-time (or near-real-time) video stream. In some examples, real-time and/or near-real-time processing, generation, and/or transmission of one or more data blocks as described herein may include any or all time delays introduced, by data processing or network transmission, between the occurrence of a trigger event and the use of the processed data, such as for display, playback, and/or any other uses associated with the one or more data blocks. In some examples, the operation 508 may include generating, using at least one processor, one or more data streams, such as video, text, bytes, and/or any other data described herein. For example, at operation 508 a mobile device may receive one or more touch screen inputs (e.g., from a user) and generate data blocks (e.g., at operation 510 as described below) representative of one or more text messages based on the one or more touch screen inputs. In some such examples, the mobile device may transmit the data blocks representative of the one or more text messages to one or more computing devices (e.g., a second mobile device) after performing one or more operations (e.g., operations 510-534) of the process 500 in order to sign the data blocks representative of the one or more text messages with one or more encryption signatures.

The process 500 may continue at operation 510, at which the electronic device 401 (or the like as described herein) may generate a first data block for the real-time (or near-real-time) video stream. In some examples, the operation 510 may include generating a first data block for a video stream. In some examples, the first data block may define a first discrete data unit comprising one or more of audio data and/or image data associated with a first time interval of the video stream (or the like as described for the operation 508). In some examples, the first data block may comprise a first data block group and at least one data block of the first data block group may receive the encryption signature (e.g., before a second data block group, as described below, receives an encryption signature). In some examples, the operation 510 may include generating, by a computing device (e.g., by at least one processor), a data block group comprising one or more data blocks.

The process 500 may continue at operation 512, at which the electronic device 401 (or the like as described herein) may generate a first data input by prepending the initialization vector and/or the authentication data to the first data block. In some examples, the operation 512 may include generating, based at least in part on the first data block, a first data input comprising the initialization vector, the first timestamp data, and/or the one or more of the first audio data or the first image data (e.g., of the first data block). In some examples, the operation 512 may include generating one or more data inputs comprising one or more initialization vectors, authentication data (e.g., one or more timestamp data or the like), and/or one or more data blocks of one or more data block groups. For example, a video stream (or the like) may be segmented into one or more data block groups comprising one or more data blocks. Further, the operation 512 may include generating one or more data inputs (e.g., for a hash algorithm 207 or the like) based, at least in part, on each of the one or more data block groups and/or each of the one or more data blocks. In some examples, the operation 514 (as described below) may "loop" or be iteratively performed (e.g., as described above with reference to FIG. 2) for each of the one or more data inputs generated at the operation 512.

The process 500 may continue at operation 514, at which the electronic device 401 (or the like as described herein) may generate first hash data of the first data input. In some examples, one or more hashes may be generated using one or more hash algorithms (e.g., hash algorithm 207) and one or more data inputs. In some examples, the operation 514 may include generating one or more hashes based, at least in part, on the one or more data inputs generated as described above at the operation 512. In some examples, the operation 514 may include generating a hash for one or more data blocks and/or one or more data block groups. For example, the operation 514 may "loop" or be iteratively performed (e.g., as described above with reference to FIG. 2) for each of the one or more data inputs (e.g., generated at the operation 512) associated with one or more data blocks and/or one or more data block groups. In some examples, the operation 514 may include generating, based at least in part on a hashing algorithm, first hash data of the first data input. In some examples, the first hash data may, at least in part, be unencrypted hash data. In some examples, the first hash data (or the like) may comprise hash data (e.g., any or all of hash data 208A-208N as described above with reference to FIG. 2).

The process 500 may continue at operation 516, at which the electronic device 401 (or the like as described herein) may generate a second data block for the real-time (or near-real-time) video stream. In some examples, the operation 516 may include generating a second data block for a video stream. In some examples, the second data block may define a second discrete data unit comprising one or more of audio data or image data associated with a second time interval of the video stream (or the like as described for the operation 508). In some examples, the second data block may comprise a second data block group and at least one data block of the second data block group may receive the encryption signature (e.g., after a first data block group receives an encryption signature). In some examples, the operation 516 may include generating, by a computing device (e.g., by at least one processor), a data block group comprising one or more data blocks.

The process 500 may continue at operation 518, at which the electronic device 401 (or the like as described herein) may generate a second data input by, at least in part, prepending the first hash data of the first data input to the second data block. In some examples, the operation 518 may include generating, based at least in part on the second data block, a second data input comprising the first hash data, the initialization vector, the first timestamp data, and/or the one or more of the second audio data or the second image data (e.g., of the second data block). In some examples, the initialization vector and/or the authentication data may be included, at least in part, in the first hash data. In some examples, the operation 518 may include generating one or more data inputs comprising one or more initialization vectors, authentication data (e.g., one or more timestamp data or the like), and/or one or more data blocks of one or more data block groups. For example, a video stream (or the like) may be segmented into one or more data block groups comprising one or more data blocks. Further, the operation 518 may include generating one or more data inputs (e.g., for a hash algorithm 207 or the like) based, at least in part, on each of the one or more data block groups and/or each of the one or more data blocks. In some examples, the operation 520 (as described below) may "loop" or be iteratively performed (e.g., as described above with reference to FIG. 2) for each of the one or more data inputs generated at the operation 518. In some examples, the initialization vector and/or the authentication data used to generate the second data input may be the same, similar, or different from the initialization vector and/or the authentication data used to generate the first data input. For example, if the first data input and the second data input are associated with a first trigger event then the first data input and the second data input may share, at least in part, the same or similar initialization vectors and/or authentication data. In such examples, if the authentication data comprises timestamp data then the first data input and the second data input may each include, at least in part, unique or specific authentication data (e.g., different timestamp data). In some examples, if the first data input and the second data input are associated with a different trigger events then the first data input and the second data input may each include, at least in part, unique or specific (i.e., different) initialization vectors and/or authentication data. In some examples, the authentication data may not be unique or specific to a trigger event but may be unique or specific to an electronic device, such as when the authentication data comprises an electronic device identifier (e.g., serial number, unique ID, etc.) and/or the like.

The process 500 may continue (as shown in FIG. 5B) at operation 520, at which the electronic device 401 (or the like as described herein) may generate second hash data of the second data input. In some examples, one or more hashes may be generated using one or more hash algorithms (e.g., hash algorithm 207) and one or more data inputs. In some examples, the operation 520 may include generating one or more hashes based, at least in part, on the one or more data inputs generated as described above at the operation 518. For example, the operation 520 may include generating, based at least in part on the hash algorithm and the first hash data, second hash data of the second data input. In some examples, the operation 520 may include generating a hash for one or more data blocks and/or one or more data block groups. For example, the operation 520 may "loop" or be iteratively performed (e.g., as described above with reference to FIG. 2) for each of the one or more data inputs (e.g., generated at the operation 518) associated with one or more data blocks and/or one or more data block groups. In some examples, the operation 520 may include generating, based at least in part on a hashing algorithm, second hash data of the second data input. In some examples, the second hash data may, at least in part, be unencrypted hash data. In some examples, the second hash data (or the like) may comprise hash data (e.g., any or all of hash data 208A-208N as described above with reference to FIG. 2).

The process 500 may continue at operation 522, at which the electronic device 401 (or the like as described herein) may repeat the operations 516-522 for one or more additional data blocks of the real-time (or near-real-time) video stream (or any other data streams as described above). For example, the electronic device 401 may generate an $N^{th}$ data block for a data stream. Further, the electronic device 401 may generate an $N^{th}$ data inputs by, at least in part, prepending the preceding hash data (e.g., of the same trigger event) of the preceding data input to the $N^{th}$ data block. Furthermore, the electronic device 401 may generate an $N^{th}$ hash data of the $N^{th}$ data input. In some examples, the operation 522 may repeat until the data stream (or trigger event that initiated the process 500) has ceased or halted. In some examples, the operation 522 may repeat for each data block or each data block group that is generated (e.g., as described above at the operation 510, the operation 516, or the like). As used herein the term "N$^{th}$" may refer to first, second, third, fourth, fifth, and/or any other ordinal numeral. While many of the foregoing examples describe generating encryption signatures for multiple data blocks, it should be appreciated that encryption signatures may be generated for individual data blocks (e.g., for a single frame of video and/or audio) using the various techniques described above according to the desired implementation.

The process 500 may continue at operation 524, at which the electronic device 401 (or the like as described herein) may generate final hash data. As used herein the term "final hash data" may refer to hash data that comprises some or all hash data generated by one or more iterations of a hash algorithm (e.g., hash algorithm 207) associated with a data stream. For example, final hash data may be generated based, at least in part, on any hash data (e.g., first, second, and/or N$^{th}$ hash data) generated for each data block and/or each data block group of a data stream. In some other examples, final hash data may be generated based, at least in part, on all hash data (e.g., first, second, and N$^{th}$ hash data) generated for a particular data stream and/or trigger event. For example, the operation 524 may include generating, via a hash algorithm, final hash data based, at least in part, on the first hash data (e.g., as described above for the operation 514), the second hash data (e.g., as described above for the operation 520), and/or the N$^{th}$ hash data (e.g., as described above for the operation 522). In some examples, the final hash data may, at least in part, be unencrypted hash data. In some examples, the final hash data (or the like) may comprise any or all of hash data 208A-208N as described above with reference to FIG. 2.

The process 500 may continue at operation 526, at which the electronic device 401 (or the like as described herein) may retrieve a private key from a secure element of a system on a chip (SoC). In some examples, the operation 526 may include retrieving, from the key storage component 460 (e.g., a secure element) of the key provider component 458 (e.g., a SoC), a key (e.g., private key 210, any or all of the keys 462B-462N, or the like). In some examples, the key may be a private key that may be unique or specific to the electronic device 401 (e.g., electronic camera 102). In some examples, the key may be installed on the electronic device 401 during a manufacturing process used to produce the electronic device 401. In some examples, the operation 526 may include generating, or deriving, one or more keys (e.g., a private key, a public key, a shared key, and/or the like as described herein). In some examples, the operation 526 may include, at least temporarily, storing a generated, or derived, key to memory (e.g., memory 422 or the like). In some examples, the operation 526 may include causing transmission of one or more generated, or derived, keys to one or more verifying peers and/or another computing device described herein.

The process 500 may continue at operation 528, at which the electronic device 401 (or the like as described herein) may encrypt the final hash data to produce an encryption signature. In some examples, the operation 528 may include encrypting, using the private key, the final hash data to produce an encryption signature (e.g., encryption signature 212). In some examples, the encryption signature may comprise the final hash data, the initialization vector, the authentication data, a flag or an identifier, and/or any other data described herein. For example, the initialization vector, the authentication data, a flag, etc., may be prepended (or otherwise combined with) the final hash data prior to encryption using the private key. In some examples, the flag or the identifier may indicate which hash algorithm (e.g., hash algorithm 207) or which hash function of the hash algorithm was used to produce the final hash (or any other hash data described for process 500 or the like). In some examples, the flag or the identifier (indicating the hash function and/or hash algorithm) may allow variation in block ciphers to be used. In some examples, the flag or the identifier may allow a hash-based message authentication code (HMAC) to be used which may negate the need for a final encryption operation for the hash data. In some examples, the flag or the identifier may allow the hash algorithm to perform cyclic redundancy check (CRC). In some examples, the flag or the identifier may allow the hash algorithm to utilize a Rivest-Shamir-Adleman (RSA) block cipher. In some examples, the first hash data (e.g., as described above for the operation 514), the second hash data (e.g., as described above for the operation 520), and/or the N$^{th}$ hash data (e.g., as described above for the operation 522) may be generated using the same, similar, or different hash functions of one or more hash algorithms. In such examples, a flag or an identifier may be included in the encryption signature that identifies the hash function and/or hash algorithm for each respective hash data. In some examples, the operation 528 may include generating, based at least in part on the data block group and/or a private key, encrypted hash data.

In some examples, the operation 528 may include determining an encryption signature based, at least in part, on the encrypted hash data, a private key, and the initialization vector. For example, before encrypting the final hash data using the private key the electronic device 401 (or the like as described herein) may further determine the initialization vector, authentication data, and/or other additional data as described herein associated with the final hash data. Further, the electronic device 401 may compile the initialization vector, authentication data, and/or other additional data into a container (e.g., batch file) comprising the final hash data, then the electronic device 401 may encrypt, at least in part, the container. In some examples, the operation 528 may include determining a first encryption signature based, at least in part, on a first initialization vector, a first trigger event, and/or the like. In such examples, the first encryption signature may be associated with (e.g., inserted into a header of) one or more data blocks of a first data block group. In some examples, the operation 528 may include determining a second encryption signature based, at least in part, on a second initialization vector, a second trigger event, and/or the like. In such examples, the second encryption signature may be associated with (e.g., inserted into a header of) one or more data blocks of a second data block group. In some examples, the first data block group may correspond to a first sequence of key frames in a data stream (e.g., a video stream) and the second data block group may correspond to a second sequence of additional key frames in the data stream. In some examples, the operation 528 may include determining an N$^{th}$ encryption signature that may correspond to an N$^{th}$ sequence of key frames in the data stream.

The process 500 may continue at operation 530, at which the electronic device 401 (or the like as described herein) may insert the encryption signature into the real-time (or near-real-time) video stream. In some examples, the operation 528 may include inserting the encryption signature into one or more data blocks and/or one or more data block groups of a data stream. In some examples, the operation 528 may include inserting the encryption signature (e.g., encryption signature 212), at least in part, into a header (or header data) of a data block of the data stream, such as by using the "USER_DATA_UNREGISTERED" SEI type, another SEI NALU type, NALU type, another data encoder specification type, and/or the like as described herein. For example, the electronic device 401 may insert the encryption signature, at least in part, into header data of a first data block, a second data, and/or an N$^{th}$ data block of a data stream (e.g., video stream).

In some examples, the electronic device 401 may insert the encryption signature independently into a first header of at least one audio data unit and into a second header at least one image data unit. For example, if the video stream comprises both an audio track and a video (or image data) track then the electronic device 401 may insert one or more encryption signatures into the audio track and also into the video (or image data) track. In such examples, the audio track and the video (or image data) track may receive one or more of the same, similar, or different encryption signatures. In some examples, portions of an audio track may receive one or more of the same or similar encryption signatures that may match, at least in part, one or more encryption signatures of a corresponding video (or image data) track (e.g., both the audio track and the video (or image data) track may correspond to the same time interval of the video stream). In such examples, a verifying peer may verify, at least in part, the one or more encryption signatures of the audio track to the one or more encryption signatures of the video (or image data) track (e.g., during the process 600 as described below with reference to FIG. 6). In some examples, the operation 528 may include splitting one or more data block groups, at least in part, into a first data block group and a second data block group. In such examples, the operation 528 may include inserting the encryption signature into the first data block group comprising at least one discrete image data unit. Further, in such examples, the operation 528 may include inserting the encryption signature into the second data block group comprising at least one discrete audio data unit.

The process 500 may continue at operation 532, at which the electronic device 401 (or the like as described herein) may cause transmission of the real-time (or near-real-time) video stream with the encryption signature. In some examples, the operation 532 may include causing transmission of a data stream comprising one or more encryption signatures, data blocks, and/or data block groups. For example, the operation 532 may include causing transmission, by a network interface (e.g., network interface(s) 404), of a data stream comprising a data block (e.g., of a data block group) containing the encryption signature (e.g., inserted into header data of the data block). In some examples, the operation 532 may include transmitting, by a network interface, a container (e.g., the container or batch file described above at the operation 528 and/or other containers as described herein) independently or separately from any or all signed data blocks. For example, the electronic device 401 may transmit the container via a first communication channel and may transmit one or more signed data blocks via a second communication channel. In some such examples, the electronic device 401 may encrypt the container (e.g., using the same or different private key used to generate the encryption signature used to sign the data blocks). In some examples, the one or more communication channels may be secured and/or encrypted (e.g., via a virtual private network or the like).

The process 500 may continue at operation 534, at which the electronic device 401 (or the like as described herein) may halt recording of the real-time (or near-real-time) video stream. In some examples, the operation 534 may include ceasing or halting the generation (e.g., by at least one processor) of a data stream comprising one or more encryption signatures, data blocks, and/or data block groups. In some examples, the operation 534 may include initializing and/or performing one or more actionable tasks. Example actionable tasks may include, without limitation, generating, storing, analyzing, and/or transmitting command data or the like as described herein to cause one or more computing devices to perform one or more operations. For example, the electronic device 401 may generate command data configured to cause display of an alert or notification on a mobile device (e.g., user device 116A), via a companion application, that provides an indication to a user that a trigger event and/or video recording has ended. Still other actionable tasks may be performed at the operation 534.

Figure 6:
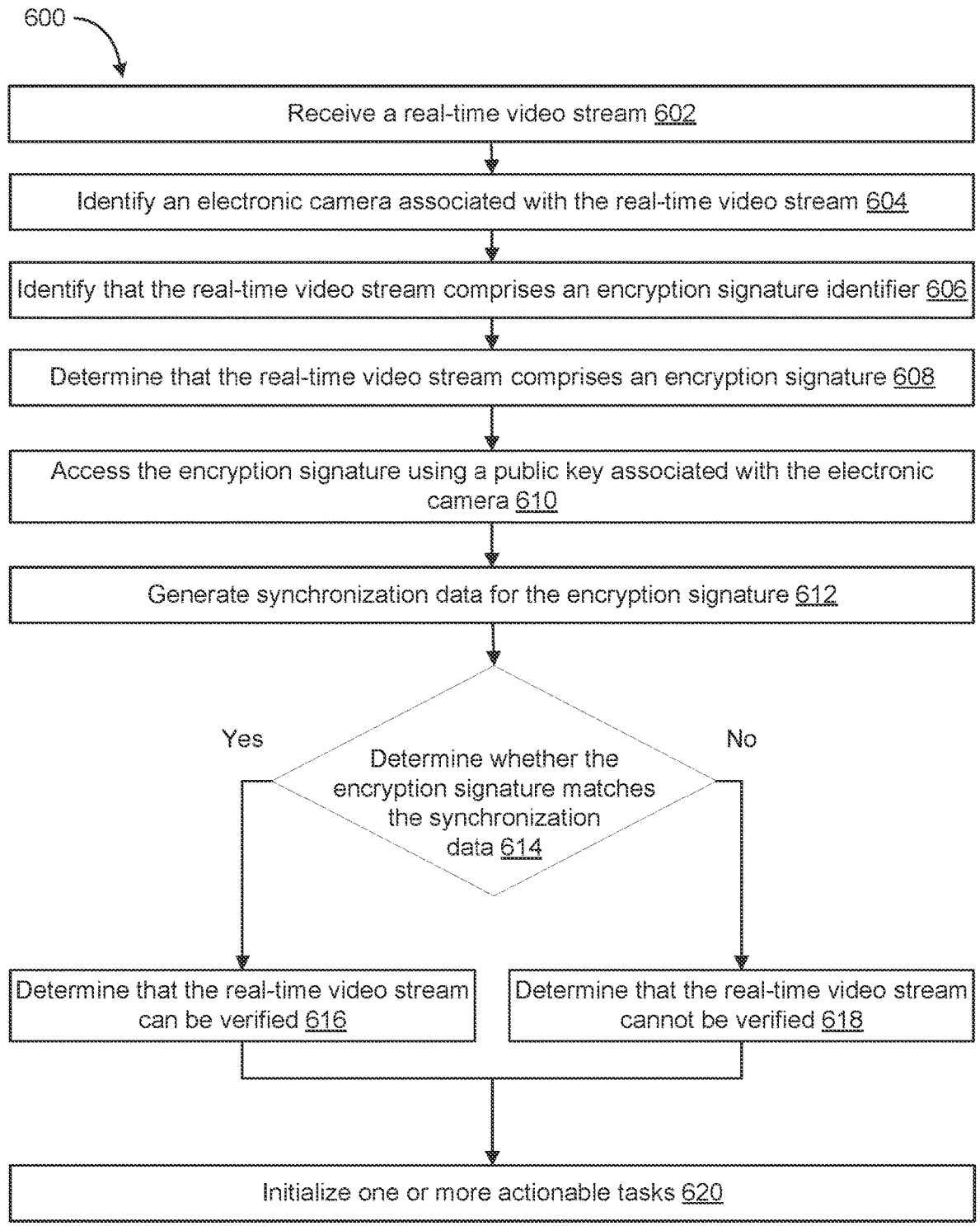
FIG. 6 illustrates an example process for verifying encryption signatures, in accordance with various aspects of the present disclosure.

FIG. 6 illustrates an example of the process 600 for verifying encryption signatures, in accordance with various aspects of the present disclosure. As shown, the process 600 may be used for verifying video data, and/or other data, generated by an electronic device 401 (e.g., electronic camera 102, or the like) and/or received by another electronic device 401 (e.g., verifying peer, remote media server 112, or the like). For example, the process 600 may be performed by a verifying peer (e.g., remote media server 112, or the like) to verify a video stream and/or other data streams provided by the electronic camera 102, or the like The operations of the process 600 may represent a series of instructions comprising computer readable machine code executable by a processing unit of one or more computing devices described herein (e.g., electronic device 401, remote media server 112, and/or any other computing device), although various operations may also be implemented in hardware. In some examples, the computer readable machine codes may be comprised of instructions selected from a native instruction set of at least one processor and/or an operating system of the electronic device. In some examples, the process 600 may be performed by one or more computing devices comprising the encryption signature verification component 114 as described above with reference to FIG. 3. In some examples, the process 600 may be performed in parallel with the process 500. For example, an electronic camera may be performing the process 500 (as described above) and transmitting one or more data blocks to a verifying peer, the verifying peer may be performing the process 600 (as described below) and verifying the encryption signatures of the one or more data blocks as they are received (e.g., while the electronic camera is still capturing a video stream).

The process 600 may begin at operation 602, at which the electronic device 401 (or the like as described herein) may receive a real-time (or near-real-time) video stream. In some examples, the operation 602 may include receiving, via a communication channel of a communication network (e.g., communication network 110), a data stream comprising one or more encryption signatures, data blocks, and/or data block groups. For example, a server may receive a data stream that was transmitted, via a communication network, at the operation 532 (as described above with reference to FIG. 5B) from an electronic camera. Further, the server may also receive a request (e.g., command data) from a user device instructing the server to verify the authenticity of the data stream and/or display, at least in part, the data stream (e.g., playback a video via a display, output audio via a speaker, render a text message, and/or the like). In some examples, the operation 602 may include initializing one or more of operations 604-620 as described below. In some examples, the operation 602 may include initializing a handshake protocol, such as to establish a communication channel between a server and an electronic camera (or any other electronic devices as described herein). In some examples, the operation 602 may include receiving a container or batch file (e.g., the container or batch file described above at the operation 528, the operation 532, and/or any other container as described herein). In some examples, the container or batch file may be received independently and/or separately from one or more received data streams.

The process 600 may continue at operation 604, at which the electronic device 401 (or the like as described herein) may identify an electronic camera associated with the real-time video stream. For example, the electronic device 401 may identify a computing device associated with the data stream received at the operation 602 (as described above) via one or more of an IP address, MAC address, UUID, serial number, handshake protocol, and/or the like. In some examples, the received data stream may include unencrypted data that may be used to identify an associated computing device. In some examples, the electronic device 401 may lookup and/or retrieve one or more public keys (e.g., public key 302) associated with the identified computing device, such as from a secured database as described above with reference to FIG. 3. In some examples, if a computing device associated with the received data stream cannot be identified at the operation 604 then the process 600 may continue at the operation 618 as described below.

The process 600 may continue at operation 606, at which the electronic device 401 (or the like as described herein) may identify whether the real-time video stream comprises an encryption signature identifier. In some examples, the operation 606 may include identifying whether one or more encryption signature identifiers are contained within a data stream comprising one or more data blocks and/or data block groups. In some examples, a data block group may contain at least one data block that includes an encryption signature identifier indicating whether the respective data block group comprises one or more encryption signatures. For example, as described above with reference to FIG. 3 the last or final data block in a data block group may include a "USER_DATA_UNREGISTERED" SEI NALU type (and/or the like) that comprises one or more encryption signatures and/or one or more encryption signature identifiers. For example, an AVC and/or HEVC encoded data block may comprise a universally unique identifier (UUID) indicating that the encryption signature is present (e.g., in that particular data block and/or another data block of a common data block group). In some examples, the operation 606 may include scanning and/or reading data from a header of one or more data blocks to determine whether a UUID (e.g., encryption signature identifier) is present. Further, if the electronic device 401 detects that a UUID (or other encryption signature identifier) indicating that the encryption signature is present, then the process 600 may continue at the operation 608 as described below. In some examples, if the electronic device 401 detects that a UUID (or other encryption signature identifier) is not present, or if a UUID indicates that the encryption signature is not present, then the process 600 may continue at the operation 618 as described below.

The process 600 may continue at operation 608, at which the electronic device 401 (or the like as described herein) may determine that the real-time video stream comprises an encryption signature. It should be understood that in some examples an attacker may have tampered with a data stream and the electronic device 401 may detect a UUID (or other encryption signature identifier) at operation 606, however the actual encryption signature may be broken, removed, and/or the like as described herein. In some examples, the operation 608 may include determining whether one or more encryption signatures are contained within a data stream comprising one or more data blocks and/or data block groups. In some examples, a data block group may contain at least one data block that includes an encryption signature for that respective data block group. For example, as described above with reference to FIG. 3 the last or final data block in a data block group may include a "USER_DATA_UNREGISTERED" SEI NALU type (and/or the like) that comprises one or more encryption signatures. In some examples, the operation 606 may include scanning and/or reading data from a header (e.g., contained in a "USER_DATA_UNREGISTERED" SEI NALU type (and/or the like)) of one or more data blocks to determine whether one or more encryption signatures are actually present. For example, the electronic device 401 may determine that encrypted data is present in the "USER_DATA_UNREGISTERED" SEI NALU type of a data block header. It should be understood that the electronic device 401 may determine that an encryption signature is present without decrypting the encryption signature. In some examples, if the electronic device 401 detects at least one encryption signature then the process 600 may continue at the operation 612 as described below. In some examples, if the electronic device 401 cannot detect at least one encryption signature then the process 600 may continue at the operation 618 as described below.

The process 600 may continue at operation 610, at which the electronic device 401 (or the like as described herein) may access the encryption signature using a public key associated with the electronic camera. In some examples, the operation 610 may include decrypting one or more encryption signatures of a data stream (e.g., from the "USER_DATA_UNREGISTERED" SEI NALU type (or the like) of a data block header). In some examples, the electronic device 401 may (if not performed at the operation 604 as described above) lookup and/or retrieve one or more public keys (e.g., public key 302) associated with the identified computing device, such as from a secured database as described above with reference to FIG. 3. In some examples, the operation 610 may include receiving, via a communication network, one or more keys (e.g., a public key, a shared key, and/or the like as described herein). In some such examples, the one or more keys may include one or more keys that were generated, or derived, by an electronic camera and/or the like (e.g., a hub device, bridge device, and/or the like). In some examples, the operation 610 may include, at least temporarily, storing a received, key to memory (e.g., memory 422 or the like). In some examples, the operation 610 may include decrypting and unpacking (e.g., at least temporarily storing to memory) one or more encryption signatures. For example, the electronic device 401 may decrypt the encryption signature of a last data block (e.g., data block 318A or the like) of a data block group (e.g., data block group 316A or the like) and may identify one or more of hash data, an initialization vector, an authentication data, a flag or identifier for a hash function, and/or any additional data as described herein.

The process 600 may continue at operation 612, at which the electronic device 401 (or the like as described herein) may generate synchronization data for the encryption signature. In some examples, the operation 612 may include generating, based on one or more of the hash data, the initialization vector, the authentication data, the flag or identifier for a hash function, and/or any additional data (identified from the encryption signature at the operation 610 as described above), synchronization data. In some examples, the operation 612 may include performing one or more of the operations 502-534 of the process 500 (e.g., locally at the remote media server 112) in order to generate synchronization data comprising one or more recreated copies of the encryption signature (e.g., recreated copies of the hash data, authentication data, and/or the like). It should be understood that a verifying peer may perform the process 500 as described above with reference to FIG. 5. In some examples, the verifying peer (e.g., the remote media server 112 that received the data stream at operation 602) may leverage one or more other secured and/or trusted servers and/or computing devices (e.g., a webs service, an application server dedicated to recreating the process 500, and/or the like) to perform the operation 612. In some examples, the operation 612 may include generating, based at least in part on a global clock and/or a local system clock synchronized with one or more other computing devices (e.g., electronic camera 102), synchronization data comprising timestamp data. In some examples, the synchronization data generated at the operation 612 may include one or more recreated components of the encryption signature received at the operation 602. For example, the synchronization data may include recreated hash data (e.g., for any or all data blocks and/or data block groups of the received data stream), timestamp data (e.g., synchronized with the timestamp data of any or all authentication data to within a tolerance of ±5%, 10%, or any other tolerance), and/or any other data of the received encryption signatures. It should be understood that that data blocks and/or data block groups of the data stream (e.g., real-time (or near-real-time) video stream) may be used, at least in part, as the input data (e.g., input data 206A-206N or the like) to recreate one or more encryption signatures at the operation 612. In examples using symmetric-key algorithms and/or symmetric encryption ciphers (e.g., instead of a public key and a private key pair, the same shared key (or symmetric key) is used for both encryption and decryption), generating synchronization data may comprise recreating at least the hash data and then encrypting the hash data with the same shared key (or symmetric key) in order to produce a recreated encryption signature. In some examples using symmetric-key algorithms and/or symmetric encryption ciphers, the shared key (or symmetric key) may be cycled periodically (e.g., the electronic device that generated or derived the shared key may generate or derive a new shared key based on a trigger event, time period, and/or the like). In such examples, the recreated encryption signature (encrypted with the shared or symmetric key) may be utilized as synchronization data as described below. In examples using asymmetric-key algorithms and/or asymmetric encryption ciphers (e.g., instead of a shared key (or symmetric key), a private key and a public key is used for encryption and decryption respectively), generating synchronization data may comprise recreating at least the hash data. In some such examples, the unencrypted hash data may be utilized as synchronization data as described below.

The process 600 may continue at operation 614, at which the electronic device 401 (or the like as described herein) may determine whether the encryption signature matches the synchronization data. In some examples, the operation 614 may include comparing the synchronization data (e.g., generated at the operation 612 as described above), in whole or in part, to the encryption signature (e.g., identified at the operation 608 as described above). For example, the hash data (e.g., unencrypted hash data, encrypted hash data, and/or the like) recreated by a verifying peer (e.g., via the process 500) may be compared, at least in part, to the hash data (e.g., final hash data, any or all of hash data 208A-208N, and/or the like as described herein), such as by comparing one or more fixed-length hash values (e.g., string of bytes defining a binary code, numeric values, and/or alphanumeric values) from the recreated hash data to the received hash data. In some examples, the recreated hash data and the received hash data may be compared and the match percentage (e.g., 0% to 100% match) between their respective fixed-length hash values may be further compared to a match threshold (e.g., a 95%, 99%, 100% match). In some examples, if the match percentage is equal to and/or greater than the match threshold then the process 600 may proceed to the operation 616. In some examples, if the match percentage is equal to and/or less than the match threshold then the process 600 may proceed to the operation 618. It should be understood that a match threshold indicating a match less than 100% may be used to account for time delays (e.g., introduced by data processing and/or network transmission) and/or data losses (e.g., introduced by data processing, network transmission, encoding, encrypting, decrypting, and/or the like). In some examples, the recreated by a verifying peer (e.g., via the process 500) may be compared, at least in part, to the hash data (e.g., final hash data, any or all of hash data 208A-208N, and/or the like as described herein), such as by comparing one or more fixed-length hash values (e.g., string of bytes defining a binary code, numeric values, and/or alphanumeric values) from the recreated hash data to the received hash data. In some examples, the operation 614 may include comparing timestamp data of the synchronization data to timestamp data of the received authentication data. In such examples, the difference between the timestamp data of the synchronization data and the timestamp data of the received authentication data may be compared to a time tolerance threshold (e.g., ±5 seconds, within a tolerance of ±10%, or any other length of time or tolerance percentage). In some examples, if the difference between the two sets of timestamp data is equal to and/or less than the time tolerance threshold then the process 600 may proceed to the operation 616. In some examples, if the difference between the two sets of timestamp data is equal to and/or greater than the time tolerance threshold then the process 600 may proceed to the operation 618. In some examples, if timestamp data is missing (e.g., due to lost connectivity of the electronic camera 102 or the like) then the process 600 may proceed to the operation 618. In some examples, integrity checks may be performed on an unreliable connection (e.g., using timestamp data). In some examples, a verifying peer may permit a certain number (e.g., a tolerance threshold) of data blocks and/or data block groups to fail verification before the verifying peer rejects the entire data stream (or video stream).

The process 600 may continue at operation 616, at which the electronic device 401 (or the like as described herein) may determine that the real-time video stream can be verified. In some examples, the operation 616 may include determining that a data stream is, at least in part, authentic and/or verifiable (e.g., within a statistical likelihood, such as 95% or 99% or greater certainty). In some examples, the operation 616 may include determining, based at least in part on the encryption signature, that an originating device of the data stream matches the identified electronic camera (e.g., electronic camera 102) as described above at operation 604. In some examples, the operation 616 may include determining, based at least in part on the encryption signature, that the data stream (or video stream) continuity from a beginning to an end is complete and/or verifiable. For example, no unsigned and/or broken encryption signatures were detected for an interval of data blocks and/or data block groups. In some examples, the continuity may be verified for the entire data stream (or video stream). In some examples, the continuity may be verified for a portion of the entire data stream (or video stream). In some examples, the operation 616 may include generating a verified output (e.g., verified output 308 as described above with reference to FIG. 3) indicating that, at least in part, the authenticity of the data stream (or video stream) can be, or was, verified. In some examples, the operation 616 may include causing transmission, via a network interface, of the verified output to one or more computing devices (e.g., user device 116A or the like).

The process 600 may continue at operation 618, at which the electronic device 401 (or the like as described herein) may determine that the real-time video stream cannot be verified. In some examples, the operation 618 may include determining that a data stream is, at least in part, unauthentic and/or unverifiable (e.g., within a statistical likelihood, such as 95% or 99% or greater certainty). In some examples, the operation 618 may include determining, based at least in part on the encryption signature, that an originating device of the data stream does not match the identified electronic camera (e.g., electronic camera 102) as described above at operation 604. In some examples, the operation 616 may include determining, based at least in part on the encryption signature, that the data stream (or video stream) continuity from a beginning to an end is incomplete and/or unverifiable. For example, at least one unsigned and/or broken encryption signature was detected for an interval of data blocks and/or data block groups. In some examples, the operation 618 may include generating an unverified output (e.g., unverified output 310 as described above with reference to FIG. 3) indicating that, at least in part, the authenticity of the data stream (or video stream) cannot be, or was not, verified. In some examples, the operation 618 may include causing transmission, via a network interface, of the unverified output to one or more computing devices (e.g., user device 116A or the like).

The process 600 may continue at operation 620, at which the electronic device 401 (or the like as described herein) may initialize one or more actionable tasks. In some examples, the operation 620 may include ceasing or halting the verification of a data stream (or video stream) that caused an unverified output. In some examples, the operation 620 may include initializing and/or performing one or more actionable tasks. Example actionable tasks may include, without limitation, generating, storing, analyzing, and/or transmitting command data or the like as described herein to cause one or more computing devices to perform one or more operations. For example, the electronic device 401 may generate command data configured to cause display of an alert or notification on a mobile device (e.g., user device 116A), via a companion application, that provides an indication to a user that a trigger event and/or video recording has ended. In some examples, the electronic device 401 may generate command data configured to cause another electronic device (e.g., electronic camera 102) to switch to another communication channel of a communication network (e.g. if an unverified output is produced). In some examples, the operation 620 may include ceasing or halting the process 600. In some examples, the operation 620 may include blocking the playback of one or more video streams. In some examples, the operation 620 may include blocking the transmission of one or more data streams. Still other actionable tasks may be performed at the operation 620.

In accordance with one or more implementations, motion or activity that would potentially trigger an alert or notification but for user configuration settings may cause a system to send data indicating potential motion detection or activity to a user device (e.g. to an application loaded on a user device). The user device may display an indication of such potential motion detection or activity, e.g., using a visual indicator displayed on a timeline view. For example, in accordance with one or more implementations a user may configure object detection settings for a camera device that are utilized for object detection at the camera device or at a remote system, and detections that do not fall within those settings (e.g. detections for classes of objects other than selected classes) may nonetheless trigger a message indicating potential motion detection or activity. For example, a user may configure detection of people, vehicles, and packages, but detection of motion or an object that is not classified as being in one of these classes may nonetheless trigger a message indicating potential motion detection or activity.

Various systems and processes described herein may include or be implemented using or in conjunction with or for a user device or computing device. A user device or computing device may be, for example, a desktop computer, laptop computer, tablet computer, personal computer, smartphone, wearable device (e.g., headset, smartwatches, smart glasses, etc.), and/or similar electronic devices equipped with at least one processor, at least one memory, and/or any other physical componentry necessary to perform the various operations described herein (e.g., a screen or other display device for rendering visual information to one or more users). For example, a mobile device may include a display device for rendering and/or displaying video data, a speaker for outputting audio data, and/or the like as described herein. Further, computing devices such as smartphones, laptop computers, tablet computers, and/or wearable devices may generally be referred to as mobile devices. In various examples, computing devices may be implemented using one or more virtual components and/or services that may not necessarily be executed on the same physical hardware.

Various systems and processes described herein may include or be implemented using or in conjunction with or for a server or server device. A server or service device may be, for example, one or more computing devices capable of functioning as a server, such as an application server, communications server, master exchange server, media server, or any other type of server. Further, a server may be a dedicated computing device (e.g., tower server, rack server, etc.) or a component (e.g., a virtual server, blade server, etc.) hosted by, or integrated with, one or more computing devices and that causes the one or more computing devices to facilitate one or more operations of a server.

Various systems and processes described herein may include or be implemented using or in conjunction with or for a storage device. A storage device may be, for example, a computer readable media capable of at least temporarily storing data or computer readable information, e.g. to non-transitory computer readable memory or storage. Example storage devices may include, without limitation, hard drives, solid-state drives, optical disc drives, network attached storage (NAS) devices independently connected to a communications network, and/or the like. In some examples, a storage device may host software to compile, host, and/or query a database (e.g., structured query language (SQL) database or the like). In some examples, a storage device may store control signals, device characteristics, and/or access credentials enabling interaction between a computing device, electronic camera, and/or server (e.g., via one or more applications).

Various systems and processes described herein may include or be implemented using a trigger event. A trigger event may be, for example, one or more stimuli that may be detected by one or more sensors of an electronic camera device and/or may cause the capture and/or streaming of video data (e.g., to a back-end server and/or a mobile device). Example trigger events may include, without limitation, motion detection (e.g., human, animal, or car movement), infrared (IR) detection, radar or radio frequency (RF) detection, inter-frame motion detection (e.g., inter-frame motion video analytics performed by an algorithm), object detection (e.g., the presence of a package), human detection (e.g., facial recognition, body recognition, gesture recognition, etc.), a doorbell button press, noise detection (e.g., a person speaking), a user input (e.g., a video recording request received from a computing device), command data (e.g., a request from a server and/or other computing device) representative of instructions to begin (e.g., execute, perform, initialize, etc.) one or more operations, activating (e.g., turning on, powering on, installing, restarting, and/or initializing) an electronic device, and/or any other stimulus that may elicit a response from an electronic camera and/or other computing device. For example, motion (e.g., from an animal) may trigger a motion sensor of an electronic camera, which may cause the electronic camera to detect a trigger event and initialize a video recording operation. Further, a companion application (e.g., hosted on a mobile device) associated with the electronic camera may receive alerts or notifications related to detection of the trigger event and may facilitate the viewing of the video recording (i.e., video stream) by a user. Moreover, an object may include, without limitation, a person/human, animal (e.g., dog, cat, bird, mouse, etc.), vehicle, tree, wall, package, door, window, and/or any other type of object.

Various systems and processes described herein may be implemented using data blocks. A data block may be, for example, one or more discrete units of computer readable information or data generated by a computing device, electronic camera, and/or at least one processor. Example data blocks may include, without limitation, a byte, pixel, frame, keyframe, metadata, video data, image data (e.g., a picture), subtitle data (e.g., words, sentences, captions, etc.), radar data, audio data (e.g., a sound), timing data (e.g., time intervals, start time, end time, etc.), block type, text data, macroblock data, NALU data, slice data, and/or any streaming media data. In some examples, data blocks may be grouped together into data block collections (or a data block group) comprising one or more data blocks as described herein.

Various systems and processes described herein involve video data. Video data may be, for example, at least one data block of image data. In some examples, video data may comprise multiple data streams (e.g., two or more of video (or image) tracks and/or audio tracks). For example, video data may comprise one or more tracks of image data (e.g., pictures, text, etc.) and one or more tracks of audio data. Further, the video data may interrelate and/or synchronize one or more tracks of image data and/or the audio data (e.g., using timing data or other information to represent a motion picture). For example, video data may refer to one or more sequential frames of image data and/or one or more sequences of audio data (e.g., encoded in accordance with H.264, H.265, and/or other video coding standards). In some examples, audio data may be encoded in accordance with advanced audio coding (AAC) and/or may be composed of one or more audio data transport stream (ADTS) frames. In some examples, a track of image data may be representative of a number of video frames (i.e., images or pictures) that may be displayed in sequence during playback (e.g., of a video stream) and each video frame may be comprised of rows and columns of pixel data related via a two-dimensional grid. In some examples, the video data may comprise one or more subtitle tracks (e.g., text, words, sentences, and/or the like representative of one or more languages corresponding to one or more other tracks) including one or more subtitle data blocks.

As set forth above, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items may be stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be sent as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. The various features and processes described above may be used independently of one another or may be combined in various ways. All possible combinations and sub-combinations are intended to fall within the scope of this disclosure.

In addition, conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any incorporated-by-reference materials.

What is claimed is:

1. An electronic device comprising:
   a camera;
   a microphone;
   one or more processors; and
   one or more computer readable media storing processor executable instructions which, when executed using the one or more processors, cause the electronic device to perform operations comprising
      generating first image data using the camera,
      generating, based on encoding the first image data, a plurality of blocks,
      determining a first set of blocks of the plurality of blocks,
      determining a first hash value based on
         a first block of the first set of blocks, and
         authentication data,
      determining a second hash value based on
         a second block of the first set of blocks, and
         a hash value determined based on a block of the first set of blocks other than the second block,
      generating encrypted data based on
         the second hash value, and
         a key stored at the electronic device,
      determining signature data comprising the authentication data and the encrypted data,
      transmitting to a remote system
         data representing the first set of blocks, and
         the signature data.

2. The electronic device of claim 1, wherein the one or more computer readable media store processor executable instructions which, when executed using the one or more processors, cause the electronic device to perform operations comprising
   determining a third hash value based on
      a third block of the first set of blocks, and
      the first hash value,
   determining a fourth hash value based on
      a fourth block of the first set of blocks, and
      the third hash value.

3. The electronic device of claim 1, wherein the one or more computer readable media store processor executable instructions which, when executed using the one or more processors, cause the electronic device to perform operations comprising
   determining, for each respective block of the first set of blocks other than the first block and the second block,
      a respective hash value based on
         the respective block, and
         a determined hash value for another block of the first set of blocks other than the second block,
   wherein the determining of the second hash value comprises determining the second hash value based on a last determined hash value of the determined respective hash values.

4. The electronic device of claim 1, wherein the authentication data comprises one or more timestamps associated with the first image data.

5. The electronic device of claim 1, wherein the authentication data comprises a first identifier associated with the electronic device.

6. The electronic device of claim 1, wherein the authentication data comprises a serial number, medium access control (MAC) address, or internet protocol (IP) address.

7. The electronic device of claim 1, wherein the authentication data comprises a timestamp corresponding to a start time of the first block.

8. The electronic device of claim 1, wherein the one or more computer readable media store processor executable instructions which, when executed using the one or more processors, cause the electronic device to perform operations comprising
   generating a first random code associated with the first image data; and
   wherein the determining of the first hash value comprises
      determining the first hash value based on
         the first block of the first set of blocks,
         the authentication data, and
         the first random code.

9. The electronic device of claim 1, wherein the one or more computer readable media store processor executable instructions which, when executed using the one or more processors, cause the electronic device to perform operations comprising
   generating a first random code associated with the first image data; and
   wherein the determining of the first hash value comprises
      determining the first hash value based on
         the first block of the first set of blocks,
         the authentication data, and
         the first random code; and
   wherein the generating of the encrypted data comprises
      generating the encrypted data based on
         the second hash value,
         the key stored at the electronic device, and
         the first random code.

10. The electronic device of claim 9, wherein the first random code is generated using a pseudorandom approach.

11. The electronic device of claim 9, first random code is generated using a true random approach.

12. The electronic device of claim 1, wherein the electronic device comprises a secure element, and wherein the one or more computer readable media store processor executable instructions which, when executed using the one or more processors, cause the electronic device to perform operations comprising accessing the key from the secure element.

13. The electronic device of claim 1, wherein the one or more computer readable media store processor executable instructions which, when executed using the one or more processors, cause the electronic device to perform operations comprising
 determining a second set of blocks of the plurality of blocks,
 determining a third hash value based on
  a third block of the second set of blocks, and
  second authentication data,
 determining a fourth hash value based on
  a fourth block of the second set of blocks, and
  a hash value that was determined based on a block of the second set of blocks other than the fourth block,
 generating second encrypted data based on
  the fourth hash value, and
  the key stored at the electronic device,
 determining second signature data comprising the second authentication data and the second encrypted data,
 transmitting to the remote system
  data representing the second set of blocks, and
  the second signature data.

14. The electronic device of claim 1, wherein the one or more computer readable media store processor executable instructions which, when executed using the one or more processors, cause the electronic device to perform operations comprising
 determining a second set of blocks of the plurality of blocks,
 determining a third hash value based on
  a third block of the second set of blocks, and
  the authentication data,
 determining a fourth hash value based on
  a fourth block of the second set of blocks, and
  a hash value that was determined based on a block of the second set of blocks other than the fourth block,
 generating second encrypted data based on
  the fourth hash value, and
  the key stored at the electronic device,
 determining second signature data comprising the authentication data and the second encrypted data,
 transmitting to the remote system
  data representing the second set of blocks, and
  the second signature data.

15. The electronic device of claim 14, wherein the transmitting to the remote system of data representing the second set of blocks comprises transmitting data representing one or more network abstract layer units (NALUs), and wherein the transmitting to the remote system of the second signature data comprises transmitting data representing a supplemental enhancement information (SEI) type NALU that includes the second signature data.

16. The electronic device of claim 1, wherein the first block represents a macroblock.

17. The electronic device of claim 1, wherein the first block represents a network abstraction layer unit (NALU).

18. The electronic device of claim 1, wherein the first block represents a slice.

19. The electronic device of claim 1, wherein the electronic device is a security camera device or video doorbell device.

20. The electronic device of claim 1, wherein the electronic device is a smartphone or tablet.

21. The electronic device of claim 1, wherein the one or more computer readable media store processor executable instructions which, when executed using the one or more processors, cause the electronic device to perform operations comprising
 determining that a type of a network abstraction layer unit (NALU) matches a certain type;
 wherein the determining of the first set of blocks of the plurality of blocks is based on the determining that the type of a network abstraction layer unit (NALU) matches the certain type.

22. The electronic device of claim 1, wherein the one or more computer readable media store processor executable instructions which, when executed using the one or more processors, cause the electronic device to perform operations comprising
 determining that a type of a block matches a certain type;
 wherein the determining of the first set of blocks of the plurality of blocks is based on the determining that the type of a block matches the certain type.

23. The electronic device of claim 1, wherein the one or more computer readable media store processor executable instructions which, when executed using the one or more processors, cause the electronic device to perform operations comprising
 determining to delimit the first set of blocks from a second set of blocks based on detecting a block of a certain type.

24. The electronic device of claim 1, wherein the one or more computer readable media store processor executable instructions which, when executed using the one or more processors, cause the electronic device to perform operations comprising
 determining to delimit the first set of blocks from a second set of blocks based on detecting a network abstraction layer unit (NALU) of a certain type.

25. The electronic device of claim 1, wherein the one or more computer readable media store processor executable instructions which, when executed using the one or more processors, cause the electronic device to perform operations comprising
 determining to delimit the first set of blocks from a second set of blocks based on detecting a video parameter set (VPS) network abstraction layer unit (NALU) type.

26. The electronic device of claim 1, wherein the key is stored in encrypted storage.

27. The electronic device of claim 1, wherein the electronic device comprises anti-fuse-based secure one-time programmable non-volatile memory, and wherein the one or more computer readable media store processor executable instructions which, when executed using the one or more processors, cause the electronic device to perform operations comprising
 accessing the key from the anti-fuse-based secure one-time programmable non-volatile memory.

28. A method comprising:
 generating first image data using a camera of an electronic device,
 generating, based on encoding the first image data, a plurality of blocks,
 determining a first set of blocks of the plurality of blocks,
 determining a first hash value based on
  a first block of the first set of blocks, and
  authentication data,
 determining a second hash value based on
  a second block of the first set of blocks, and
  a hash value that was determined based on a block of the first set of blocks other than the second block, generating encrypted data based on
  the second hash value, and
  a key stored at the electronic device,
determining signature data comprising the authentication data and the encrypted data,
transmitting from the electronic device to a remote system
  data representing the first set of blocks, and
  the signature data.

29. The method of claim 28, wherein encoding the first image data comprises encoding the first image data in accordance with H.264.

30. The method of claim 28, wherein encoding the first image data comprises encoding the first image data in accordance with H.265.

31. The method of claim 28, wherein the method comprises
  generating a first random code associated with the first image data; and
  wherein the determining of the first hash value comprises
    determining the first hash value based on
      the first block of the first set of blocks,
      the authentication data, and
      the first random code.

32. The method of claim 28, wherein the method comprises
  generating a first random code associated with the first image data; and
  wherein the determining of the first hash value comprises
    determining the first hash value based on
      the first block of the first set of blocks,
      the authentication data, and
      the first random code; and
  wherein the generating of the encrypted data comprises
    generating the encrypted data based on
      the second hash value,
      the key stored at the electronic device, and
      the first random code.

33. A computer readable medium storing executable instructions which, when executed using a processor, cause an electronic device to
  generate first image data,
  generate, based on encoding the first image data, a plurality of blocks,
  determine a first set of blocks of the plurality of blocks,
  determine a first hash value based on
    a first block of the first set of blocks, and
    authentication data,
  determine a second hash value based on
    a second block of the first set of blocks, and
    a hash value determined based on a block of the first set of blocks other than the second block,
  generate encrypted data based on
    the second hash value, and
    a key stored at the electronic device,
  determine signature data comprising the authentication data and the encrypted data,
  transmit to a remote system
    data representing the first set of blocks, and
    the signature data.

34. The computer readable medium of claim 33, wherein the executable instructions, cause the electronic device to
  determine a third hash value based on
    a third block of the first set of blocks, and
    the first hash value,
  determine a fourth hash value based on
    a fourth block of the first set of blocks, and
    the third hash value.

35. The computer readable medium of claim 33, wherein the executable instructions, cause the electronic device to
  determine, for each respective block of the first set of blocks other than the first block and the second block,
    a respective hash value based on
      the respective block, and
      a determined hash value for another block of the first set of blocks other than the second block,
  wherein the determining of the second hash value comprises determining the second hash value based on a last determined hash value of the determined respective hash values.

* * * * *